(12) United States Patent
Chen et al.

(10) Patent No.: US 9,329,328 B2
(45) Date of Patent: May 3, 2016

(54) LIGHT GUIDE PLATE AND BACKLIGHT MODULE USING THE SAME

(71) Applicants: Shang-Wei Chen, Hsin-Chu (TW); Min-Yi Hsu, Hsin-Chu (TW); Chao-Hung Weng, Hsin-Chu (TW); Wen-Hsin Lo, Hsin-Chu (TW); Han-Wen Tsai, Hsin-Chu (TW); Ming-Feng Kuo, Hsin-Chu (TW); Ming-Dah Liu, Hsin-Chu (TW)

(72) Inventors: Shang-Wei Chen, Hsin-Chu (TW); Min-Yi Hsu, Hsin-Chu (TW); Chao-Hung Weng, Hsin-Chu (TW); Wen-Hsin Lo, Hsin-Chu (TW); Han-Wen Tsai, Hsin-Chu (TW); Ming-Feng Kuo, Hsin-Chu (TW); Ming-Dah Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 218 days.

(21) Appl. No.: 13/873,251

(22) Filed: Apr. 30, 2013

(65) Prior Publication Data
US 2013/0286679 A1 Oct. 31, 2013

(30) Foreign Application Priority Data

Apr. 30, 2012 (TW) .............................. 101115379 A
Jul. 23, 2012 (TW) .............................. 101126502 A

(51) Int. Cl.
*G02B 6/00* (2006.01)
*F21V 8/00* (2006.01)

(52) U.S. Cl.
CPC ............ *G02B 6/0053* (2013.01); *G02B 6/0015* (2013.01); *G02B 6/0016* (2013.01); *G02B 6/0036* (2013.01); *G02B 6/0051* (2013.01)

(58) Field of Classification Search
CPC .. G02B 6/0036; G02B 6/0051; G02B 6/0053; G02B 6/0015; G02B 6/0016
USPC .................................................. 362/607, 625
See application file for complete search history.

(56) References Cited

U.S. PATENT DOCUMENTS 5,980,054 A * 11/1999 Fukui et al. .................... 362/625
6,454,452 B1   9/2002 Sasagawa et al.
(Continued)

FOREIGN PATENT DOCUMENTS

CN      1470917      1/2004
CN    101042488      9/2007
(Continued)

OTHER PUBLICATIONS

"Office Action of China Counterpart Application", issued on Jan. 28, 2015, p. 1-p. 22, in which the listed references (Ref. 1-9) were cited.
(Continued)

*Primary Examiner* — Nimeshkumar Patel
*Assistant Examiner* — Christopher Raabe
(74) *Attorney, Agent, or Firm* — Jianq Chyun IP Office

(57) ABSTRACT

A backlight module includes a light guide plate (LGP), a light source, and at least one prism sheet. The LGP includes a light emitting surface, a bottom surface, a light incident surface, and a plurality of first microstructures on the bottom surface. Each of the first microstructure is a recessed structure and includes a first surface and a second surface. An included angle between the first surface and the bottom surface ranges from 15 degrees to 27 degrees. An included angle between the second surface and the bottom surface ranges from 50 degrees to 90 degrees. The light source provides a light beam, and an included angle between a light emitting direction of the light beam emitted from the light emitting surface of the LGP and a normal direction of the light emitting surface is greater than 30 degrees. The prism sheet is disposed above the light emitting surface.

44 Claims, 30 Drawing Sheets

(56) References Cited

U.S. PATENT DOCUMENTS

| | | | |
|---|---|---|---|
| 6,659,615 B2 * | 12/2003 | Umemoto | 362/600 |
| 6,834,973 B2 | 12/2004 | Ohkawa | |
| 6,967,698 B2 * | 11/2005 | Tanoue et al. | 349/62 |
| 7,046,905 B1 * | 5/2006 | Gardiner et al. | 385/146 |
| 7,507,011 B2 * | 3/2009 | Ueno et al. | 362/625 |
| 7,517,131 B2 * | 4/2009 | Hsieh | 362/625 |
| 7,824,094 B2 * | 11/2010 | Hsieh | 362/626 |
| 8,092,068 B2 * | 1/2012 | Parker et al. | 362/620 |
| 2003/0117793 A1 | 6/2003 | Shin et al. | |
| 2003/0137824 A1 * | 7/2003 | Shinohara et al. | 362/31 |
| 2009/0009688 A1 | 1/2009 | Koganezawa et al. | |
| 2010/0091520 A1 | 4/2010 | Liao | |
| 2010/0277669 A1 * | 11/2010 | Adachi et al. | 349/62 |
| 2011/0090427 A1 | 4/2011 | Ohue et al. | |
| 2011/0241573 A1 | 10/2011 | Tsai et al. | |

FOREIGN PATENT DOCUMENTS

| | | |
|---|---|---|
| CN | 101101351 | 1/2008 |
| CN | 101666944 | 3/2010 |
| CN | 101975360 | 2/2011 |
| JP | 07-072477 | 3/1995 |
| TW | 546520 | 8/2003 |
| TW | I222533 | 10/2004 |
| TW | 200428044 | 12/2004 |
| TW | 200608083 | 3/2006 |
| TW | 200745490 | 2/2007 |
| TW | I282021 | 6/2007 |
| TW | M321111 | 10/2007 |
| TW | 200743863 | 12/2007 |
| TW | I292845 | 1/2008 |
| TW | 200827764 | 7/2008 |
| TW | 200837452 | 9/2008 |
| TW | 201213970 | 4/2012 |

OTHER PUBLICATIONS

"Office Action of Taiwan Counterpart Application", issued on Jan. 22, 2015, p. 1-p. 10, in which the listed references (Ref. 10-13) were cited.

"Office Action of China Counterpart Application", issued on Jul. 28, 2015, p. 1-p. 21, in which the listed references were cited.

* cited by examiner

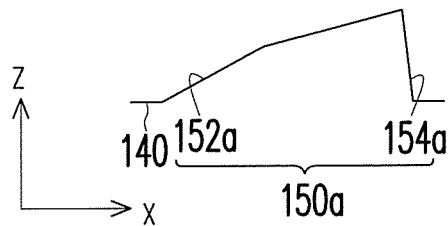
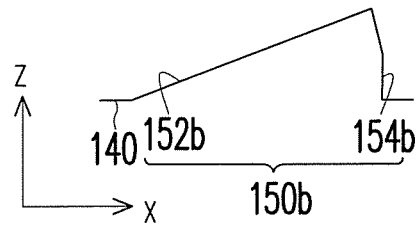
FIG. 2A  FIG. 2B
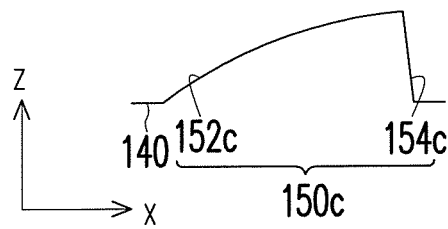
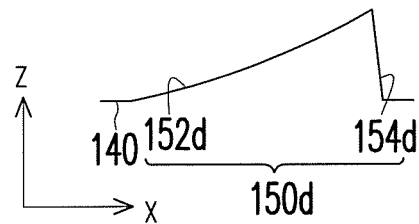
FIG. 2C  FIG. 2D
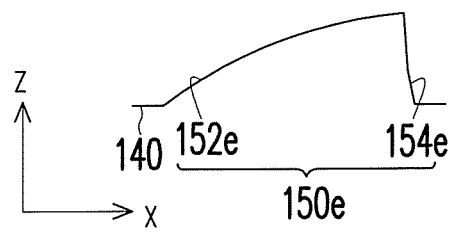
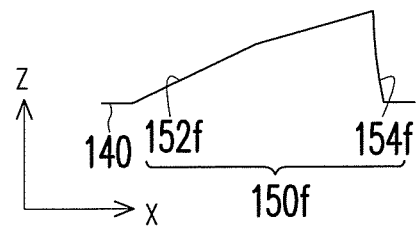
FIG. 2E  FIG. 2F

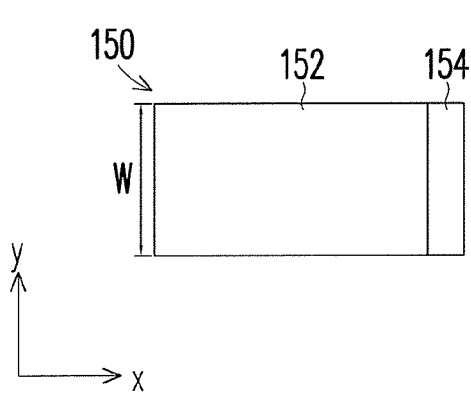 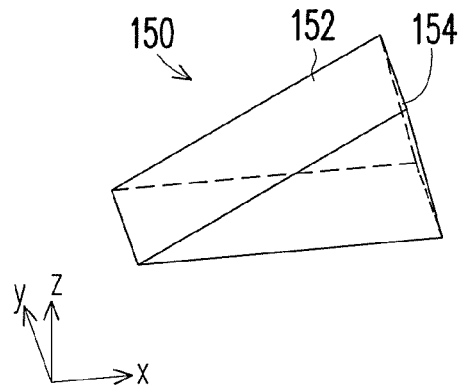
FIG. 4A   FIG. 4B
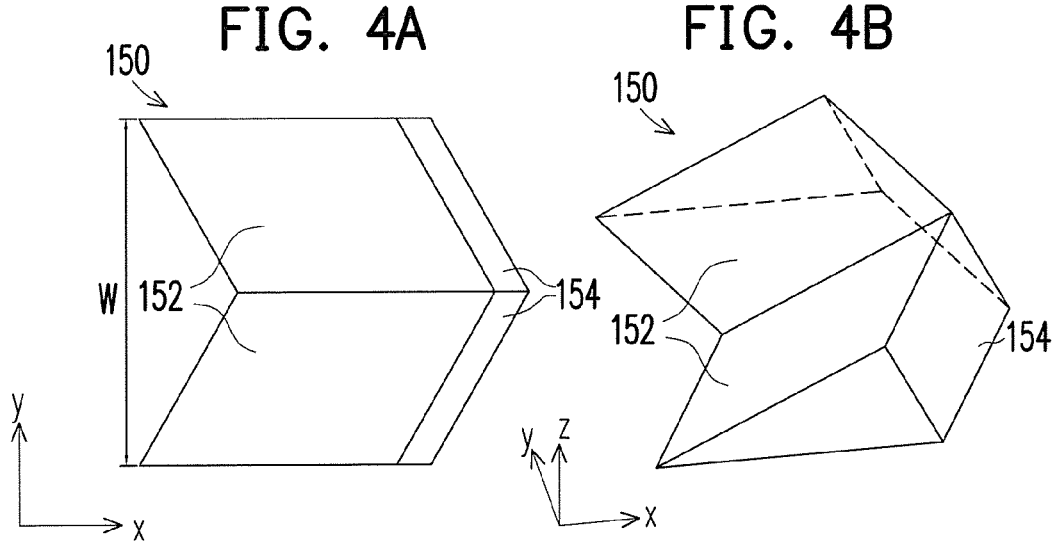 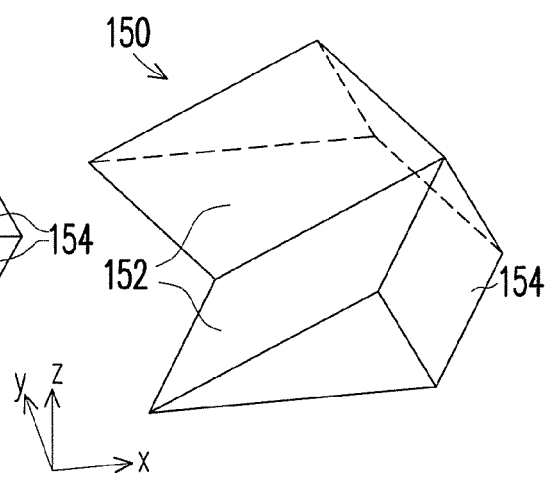
FIG. 5A   FIG. 5B
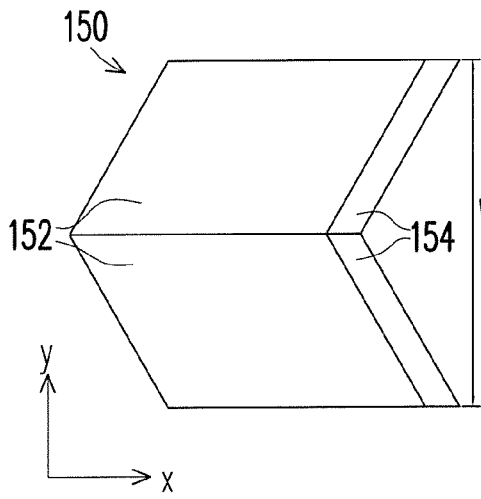 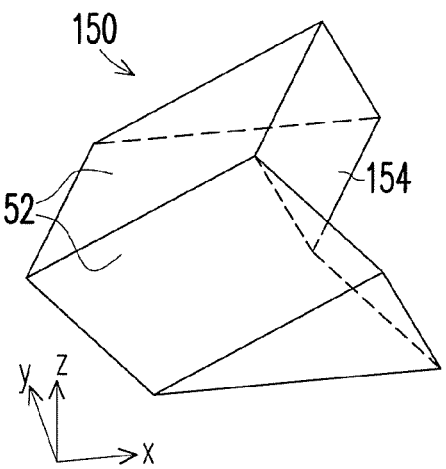
FIG. 6A   FIG. 6B

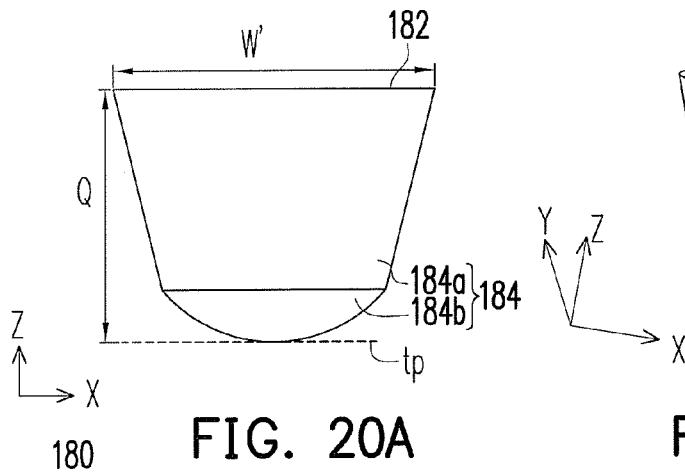
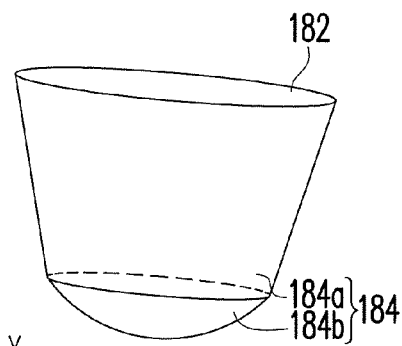
FIG. 20A    FIG. 20B
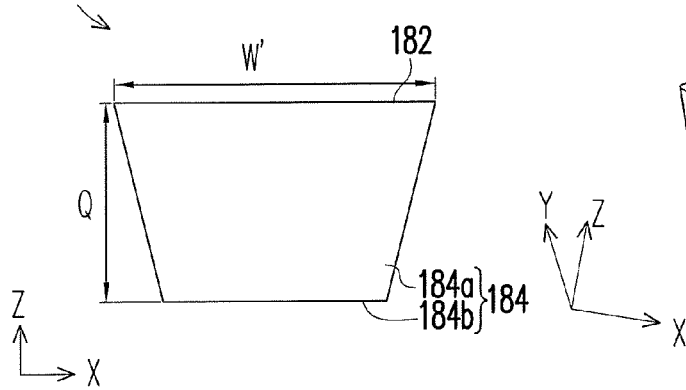
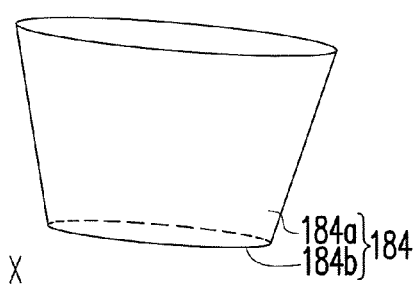
FIG. 21A    FIG. 21B
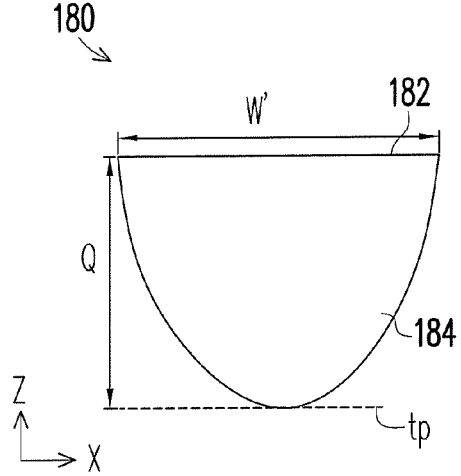
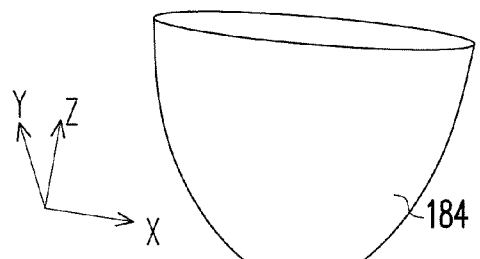
FIG. 22A    FIG. 22B

LIGHT GUIDE PLATE AND BACKLIGHT MODULE USING THE SAME

CROSS-REFERENCE TO RELATED APPLICATION

This application claims the priority benefits of Taiwan application serial no. 101115379, filed on Apr. 30, 2012, and Taiwan application serial no. 101126502, filed on Jul. 23, 2012. The entirety of each of the above-mentioned patent applications is hereby incorporated by reference herein and made a part of specification.

BACKGROUND

1. Technical Field

The invention relates to a planar light source. Particularly, the invention relates to a backlight module.

2. Related Art

Along with development of display technique, flat displays gradually replace conventional cathode ray tube (CRT) displays and become popular in display market. In the flat displays, liquid crystal displays (LCDs) are most popular and widely used. A general LCD is mainly composed of a backlight module and a liquid crystal panel. Since the liquid crystal panel is non-luminous itself, the backlight module is used to provide a light source for displaying.

Generally, the conventional backlight modules are grouped into direct type backlight modules and edge type backlight modules. Taking the edge type backlight module as an example, a light beam provided by a light source disposed at a light incident surface of a light guide plate is transmitted in internal of the light guide plate, and an optical microstructure (for example, an etching pattern or a screen printing pattern) at bottom of the light guide plate may spoil a total reflection of the light beam and guide the light beam to emit from a light emitting surface of the light guide plate, so as to form a planar light source.

U.S. Pat. No. 6,834,973 discloses a light guide plate having micro reflection structures on a bottom surface. Taiwan Patent No. 546520 discloses a light guide plate having wedge-shaped reflection grooves. Taiwan Patent No. 1282021 discloses a light guide plate, in which a microstructure has an arc-shaped reflection surface, and a shape of the microstructure is an arc quadrilateral or a fan viewed from a light emitting surface. Taiwan Patent No. 1222533 discloses a prism sheet having concave and convex patterns. U.S. Patent publication No. 20110241573 discloses a light guide plate having a plurality of groove groups, where each of the groove groups includes a plurality of bending grooves. Taiwan Patent publication No. 201213970 discloses a light guide plate, where a light reflection surface of the light guide plate has light guide microstructures and protruding microstructures. Taiwan Patent No. M321111 discloses a situation that microstructures are recessed into or protruded out from a bottom surface of the light guide plate. Taiwan Patent publication No. 200428044 discloses a method for manufacturing a light guide plate. Taiwan Patent No. 1292845 discloses a method for manufacturing a light guide plate mold core.

SUMMARY

The invention is directed to a backlight module, which provides a good forward luminance.

The invention provides a light guide plate, in which a certain viewing angle range has concentrated light intensity distribution.

Additional aspects and advantages of the invention will be set forth in the description of the techniques disclosed in the invention.

To achieve one of aforementioned and other advantages, an embodiment of the invention provides a backlight module including a light guide plate, a light source, and at least one prism sheet. The light guide plate includes a light emitting surface, a bottom surface opposite to the light emitting surface, a light incident surface connecting with the light emitting surface and the bottom surface, and a plurality of first microstructures on the bottom surface. Each of the first microstructures is a recessed structure and includes a first surface and a second surface. The first surface faces to the light incident surface, and an included angle between the first surface and the bottom surface ranges from 15 degrees to 27 degrees. The first surface of each of the first microstructures is located between the second surface and the light incident surface. An included angle between the second surface and the bottom surface ranges from 50 degrees to 90 degrees. The light source is suitable for providing a light beam, and the light beam enters the light guide plate via the light incident surface. An included angle between a light emitting direction of the light beam emitted from the light emitting surface of the light guide plate and a normal direction of the light emitting surface is greater than 30 degrees. The at least one prism sheet is disposed above the light emitting surface of the light guide plate.

In one embodiment, the at least one prism sheet includes a first prism sheet and a second prism sheet. The first prism sheet includes a plurality of first strip prism portions parallel to each other and the second prism sheet includes a plurality of second strip prism portions parallel to each other. The first prism sheet is disposed between the light guide plate and the second prism sheet, and an extending direction of the first strip prism portions is substantially perpendicular to an extending direction of the second strip prism portions.

In one embodiment, the backlight module further includes a diffusion sheet, and the diffusion sheet is disposed between the light guide plate and the at least one prism sheet.

To achieve one of aforementioned and other advantages, an embodiment of the invention provides the above-mentioned light guide plate. The light guide plate has a light emitting surface, a bottom surface opposite to the light emitting surface, a light incident surface connecting with the light emitting surface and the bottom surface, and a plurality of first microstructures on the bottom surface. Each of the first microstructures is a recessed structure and includes a first surface and a second surface. The first surface faces to the light incident surface, and an included angle between the first surface and the bottom surface ranges from 15 degrees to 27 degrees. The first surface of each of the first microstructures is located between the second surface and the light incident surface. An included angle between the second surface and the bottom surface ranges from 50 degrees to 90 degrees.

In one embodiment, the included angle between the light emitting direction of the light beam emitted from the light emitting surface of the light guide plate and the normal direction of the light emitting surface ranges from 30 degrees to 70 degrees.

In one embodiment, each of the first microstructures extends along a path, and the path is composed of at least one straight line or at least one curve.

In one embodiment, each of the first microstructures extends along a path, and the path is composed of at least one straight line and at least one curve.

In one embodiment, viewing from the light emitting surface, a shape of each of the first microstructures is composed of at least one quadrilateral or at least one arc or at least one fan.

In one embodiment, viewing from the light emitting surface, a shape of each of the first microstructures is composed of at least one quadrilateral and at least one arc.

In one embodiment, the bottom surface is substantially perpendicular to the light incident surface.

In one embodiment, the light guide plate further includes a plurality of second microstructures on the light incident surface.

In one embodiment, the light guide plate further includes a plurality of third microstructures on the light emitting surface.

In one embodiment, the first microstructures are disposed on the bottom surface in dispersion, and a distribution density of the first microstructures away from the light incident surface is higher than a distribution density of the first microstructures close to the light incident surface, or the first microstructures are averagely disposed on the bottom surface.

In one embodiment, the light guide plate further has a plurality of fourth microstructures on the bottom surface, each of the fourth microstructures is a protruding structure and has a third surface, the fourth microstructures are attached to the bottom surface, and the third surface protrudes out from the bottom surface.

In one embodiment, viewing from the light emitting surface, a shape of an orthographic projection of each of the fourth microstructures on the bottom surface is a round, an ellipse or a polygon.

In one embodiment, the third surface is a circular arc surface.

In one embodiment, a tangent plane of the circular arc surface is parallel to the bottom surface, and a vertical distance between the tangent plane and the bottom surface ranges from 3 μm to 10 μm.

In one embodiment, the third surface has at least one side surface and a supporting bottom surface, and the supporting bottom surface is a curved surface or a plane.

In one embodiment, a vertical distance between the supporting bottom surface and the bottom surface ranges from 3 μm to 10 μm.

In one embodiment, a width of the orthographic projection of the third surface on the bottom surface ranges from 10 μm to 60 μm.

In one embodiment, a distribution density of the fourth microstructures is lower than a distribution density of the first microstructures.

In one embodiment, the fourth microstructures are averagely disposed on the bottom surface in dispersion, and a distance between the adjacent fourth microstructures ranges from 100 μm to 500 μm.

In one embodiment, a distribution density of the fourth microstructures away from the light incident surface is higher than a distribution density of the fourth microstructures close to the light incident surface, and a distance between the adjacent fourth microstructures ranges from 30 μm to 500 μm.

In one embodiment, a viewing angle range of light intensity full width at half maximum (FWHM) of the light beam emitted from the light emitting surface of the light guide plate ranges from 120 degrees to 170 degrees.

In one embodiment, the included angle between the light emitting direction of the light beam emitted from the light emitting surface of the light guide plate and the normal direction of the light emitting surface ranges from 40 degrees to 60 degrees.

In one embodiment, the included angle between the light emitting direction of the light beam emitted from the light emitting surface of the light guide plate and the normal direction of the light emitting surface is greater than 40 degrees.

To achieve one of aforementioned and other advantages, an embodiment of the invention provides a backlight module including a light guide plate, a light source, and at least one prism sheet. The light guide plate includes a light emitting surface, a bottom surface opposite to the light emitting surface, a light incident surface connecting with the light emitting surface and the bottom surface, and a plurality of first microstructures on the bottom surface. Each of the first microstructures is a recessed structure and includes a first surface and a second surface. The first surface faces to the light incident surface, and an included angle between the first surface and the bottom surface ranges from 1 degrees to 10 degrees. The first surface of each of the first microstructures is located between the second surface and the light incident surface. An included angle between the second surface and the bottom surface ranges from 0 degrees to 90 degrees. The light source is suitable for providing a light beam, and the light beam enters the light guide plate via the light incident surface. An included angle between a light emitting direction of the light beam emitted from the light emitting surface of the light guide plate and a normal direction of the light emitting surface is from 79 degrees to 82 degrees. The at least one prism sheet is disposed above the light emitting surface of the light guide plate.

In one embodiment, the prism sheet is an inverse prism sheet and comprises a transparent substrate and a plurality of strip prism portions parallel to each other formed on the transparent substrate, and the strip prism portions are located between the transparent substrate and the light guide plate.

To achieve one of aforementioned and other advantages, an embodiment of the invention provides the above-mentioned light guide plate. The light guide plate has a light emitting surface, a bottom surface opposite to the light emitting surface, a light incident surface connecting with the light emitting surface and the bottom surface, and a plurality of first microstructures on the bottom surface. Each of the first microstructures is a recessed structure and includes a first surface and a second surface. The first surface faces to the light incident surface, and an included angle between the first surface and the bottom surface ranges from 1 degrees to 10 degrees. The first surface of each of the first microstructures is located between the second surface and the light incident surface. An included angle between the second surface and the bottom surface ranges from 0 degrees to 90 degrees.

According to the above description, the embodiments of the invention have at least one of following advantages or effects. In the backlight module of the invention, since the light guide plate uses the first microstructures having the first surfaces and the second surfaces, in collaboration with the first surfaces and the second surfaces, the light beam could be effectively guided to a direction capable of being fully used by the prism sheet, so as to enhance a forward luminance of the backlight module. Moreover, when the light guide plate is configured with the fourth microstructures, it is avoided to produce bright spot defects due to electrostatic adsorption, and meanwhile a whole luminance distribution of the light guide plate could be adjusted.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 2A-2F are schematic diagrams of a plurality of variations of a first microstructure of FIG. 1A.

FIGS. 4A-12A are top views of a plurality of variations of a first microstructure of FIG. 1B.

FIGS. 4B-12B are three-dimensional views of a plurality of variations of a first microstructure of FIG. 1B.

FIGS. 17A-22A are side views of a plurality of variations of a fourth microstructure of FIG. 16.

FIGS. 17B-22B are three-dimensional views of a plurality of variations of a fourth microstructure of FIG. 16.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
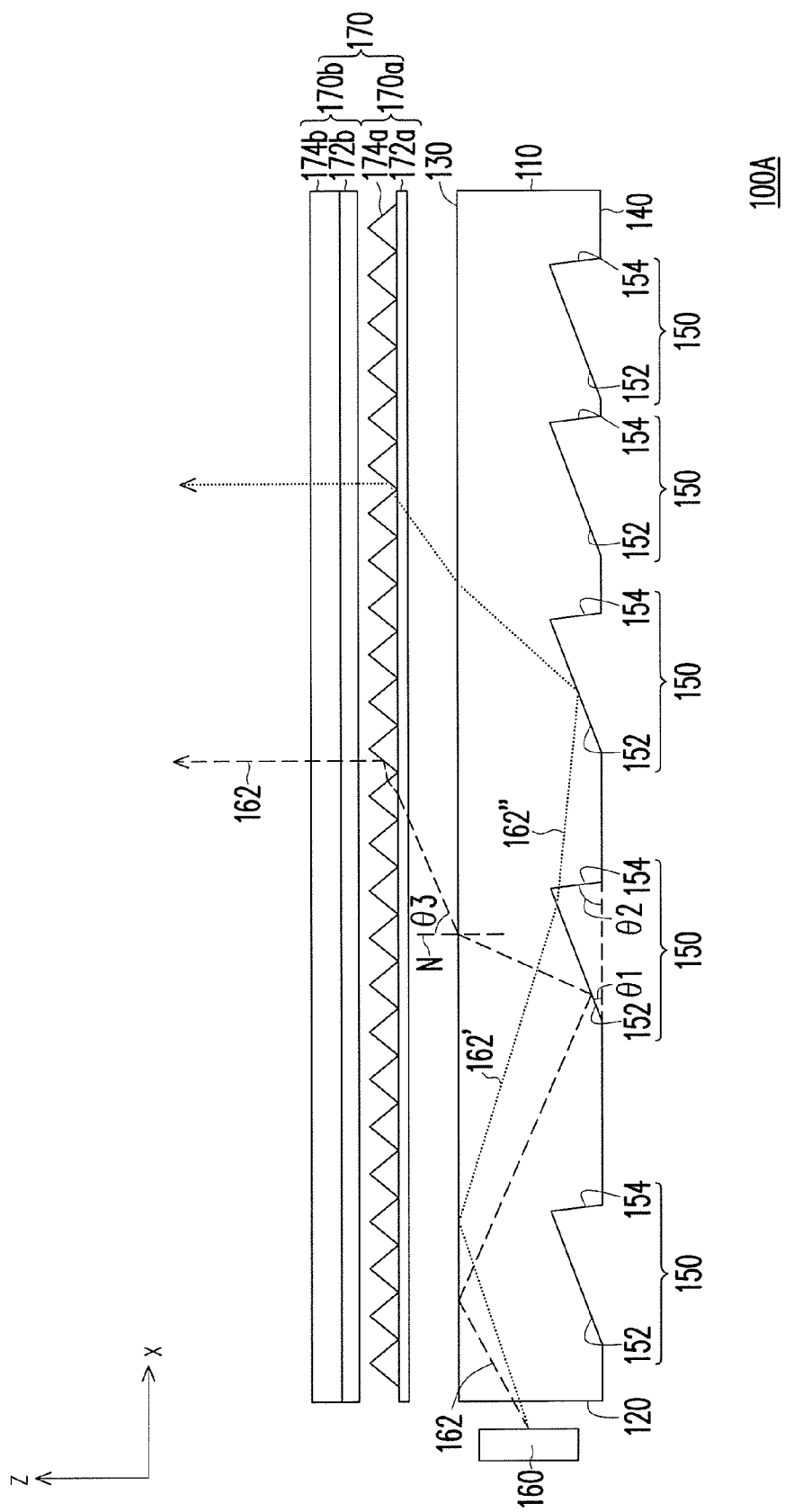
FIG. 1A is a schematic diagram of a backlight module according to an embodiment of the invention.

FIG. 1A is a side view of a backlight module according to an embodiment of the invention. Referring to FIG. 1A, the backlight module 100A of the embodiment includes a light guide plate (LGP) 110, a light source 160, and at least one prism sheet 170. In the embodiment, the prism sheets 170 include a first prism sheet 170a and a second prism sheet 170b. The LGP 110 has a light incident surface 120, a light emitting surface 130, a bottom surface 140 opposite to the light emitting surface 130, and a plurality of first microstructures 150 on the bottom surface 140, and the light incident surface 120 connects with the light emitting surface 130 and the bottom surface 140. In FIG. 1A, although two prism sheets (i.e. the first prism sheet 170a and the second prism sheet 170b) and five first microstructures 150 are taken as an example for description, the number of the prism sheets and the number of the first microstructures are not limited by the invention. Those skilled in the art could adjust the number of the prism sheets and the number of the first microstructures of the backlight module 100A according to a design requirement of an actual product with reference of instructions of the embodiment.

To facilitate describing directions of various component and structures in the backlight module 100A, a Cartesian coordinate system is defined, which includes an x-axis, a y-axis, and a z-axis perpendicular to each other, where the y-axis is a direction perpendicular to a paper surface, a y-z plane is substantially parallel to the light incident surface 120, an x-y plane is substantially parallel to the light emitting surface 130 and the bottom surface 140, and an x-z plane is substantially perpendicular to the light incident surface 120 and the light emitting surface 130.

In detail, the first microstructures 150 on the LGP 110 are disposed on the bottom surface 140 in dispersion, where a distribution density of the first microstructures 150 away from the light incident surface 120 is higher, and a distribution density of the first microstructures 150 close to the light incident surface 120 is lower. In an embodiment, each of the first microstructures 150 is a recessed structure and includes a first surface 152 and a second surface 154. The first surface 152 faces to the light incident surface 120, and an included angle $\theta 1$ between the first surface 152 and the bottom surface 140 ranges from 15 degrees to 27 degrees (i.e. the included angle $\theta 1$ is greater than or equal to 15 degrees and smaller than or equal to 27 degrees), which is preferably 21 degrees. The first surface 152 of each of the first microstructures 150 is located between the second surface 154 and the light incident surface 120. An included angle $\theta 2$ between the second surface 154 and the bottom surface 140 ranges from 50 degrees to 90 degrees (i.e. the included angle $\theta 2$ is greater than or equal to 50 degrees and smaller than or equal to 90 degrees). Moreover, in the embodiment, a material of the LGP 110 is, for example, polymethyl methacrylate (PMMA) or polycarbonate (PC), though the invention is not limited thereto.

Figure 1B:
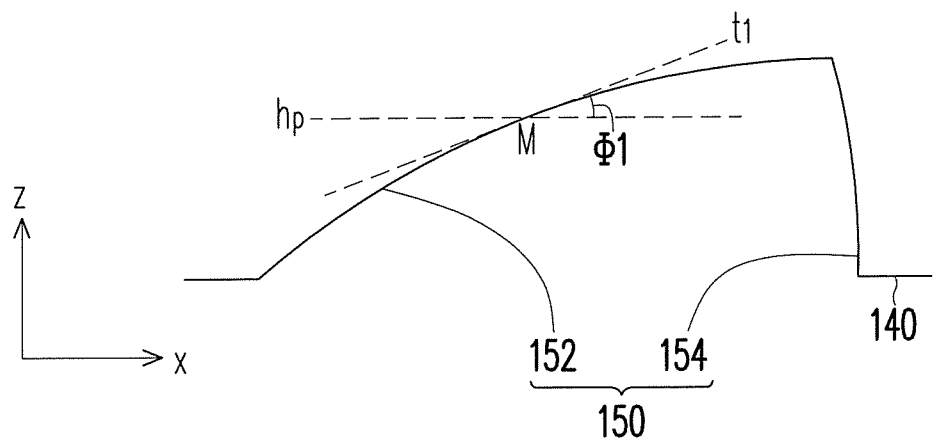
FIG. 1B and FIG. 1C are partial enlarged views of the first microstructure of FIG. 1A.
Figure 1C:
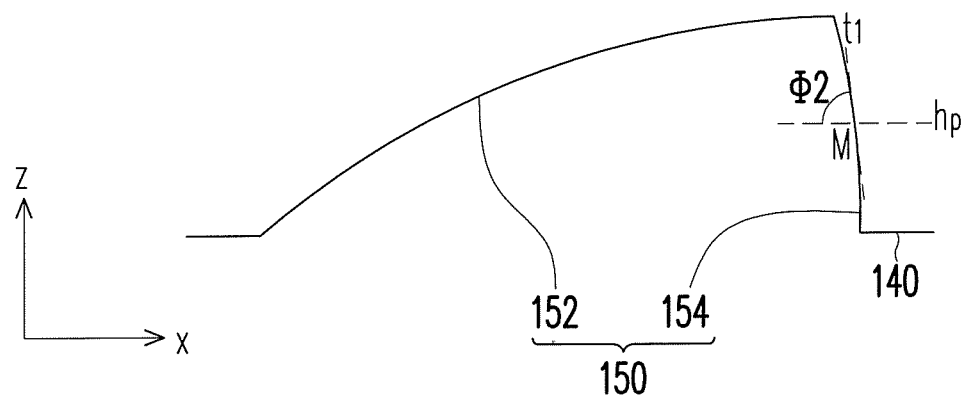

FIG. 1B and FIG. 1C are partial enlarged views of the first microstructure of FIG. 1A. Referring to FIG. 1A and FIG. 1B, in the embodiment, a tilt angle $\Phi 1$ between a tangent t1 of any point M on the first surface 152 and a reference plane hp (parallel to the bottom surface 140) ranges from 0 degree to 90 degrees. Similarly, referring to FIG. 1A and FIG. 1C, a tilt angle $\Phi 2$ between a tangent t1 of any point M on the second surface 154 and the reference plane hp (parallel to the bottom surface 140) ranges from 0 degree to 90 degrees. In the embodiment, according to the design of the tilt angle $\Phi 1$ and the tilt angle $\Phi 2$, an included angle $\theta 3$ between a light emitting direction of a light beam 162 emitted from the light emitting surface 130 of the LGP 110 and a normal direction N of the light emitting surface 130 could be greater than 40 degrees, which is preferably greater than 30 degrees.

As shown in FIG. 1A, the light beam 162 (represented by dot lines) enters the LGP 110 through the light incident surface 120, and the light beam 162 leaves the LGP 110 through the light emitting surface 130. In the embodiment, the included angle $\theta 3$ between the light emitting direction of the light beam 162 emitted from the light emitting surface 130 of the LGP 110 and the normal direction N of the light emitting surface 130 is greater than 40 degrees, which is preferably greater than 30 degrees. In another embodiment, the included angle $\theta 3$ between the light emitting direction of the light beam 162 emitted from the light emitting surface 130 of the LGP 110 and the normal direction N of the light emitting surface 130 particularly ranges from 40 degrees to 60 degrees, which preferably ranges from 30 degrees to 70 degrees. In detail, after the light beam 162 enters the LGP 110 through the light incident surface 120, the first microstructures 150 could spoil a total reflection of the light beam 162 through the first surfaces 152 or the second surfaces 154. In this way, the light beam 162 could emit out from the light emitting surface 130 to leave the LGP 110. Namely, in the backlight module 100A of the embodiment, the bottom surface 140 provides a diffusion effect to the light beam through the first microstructures 150, so that the light beam 162 provided by the backlight module 100A has better uniformity.

Figure 1D:
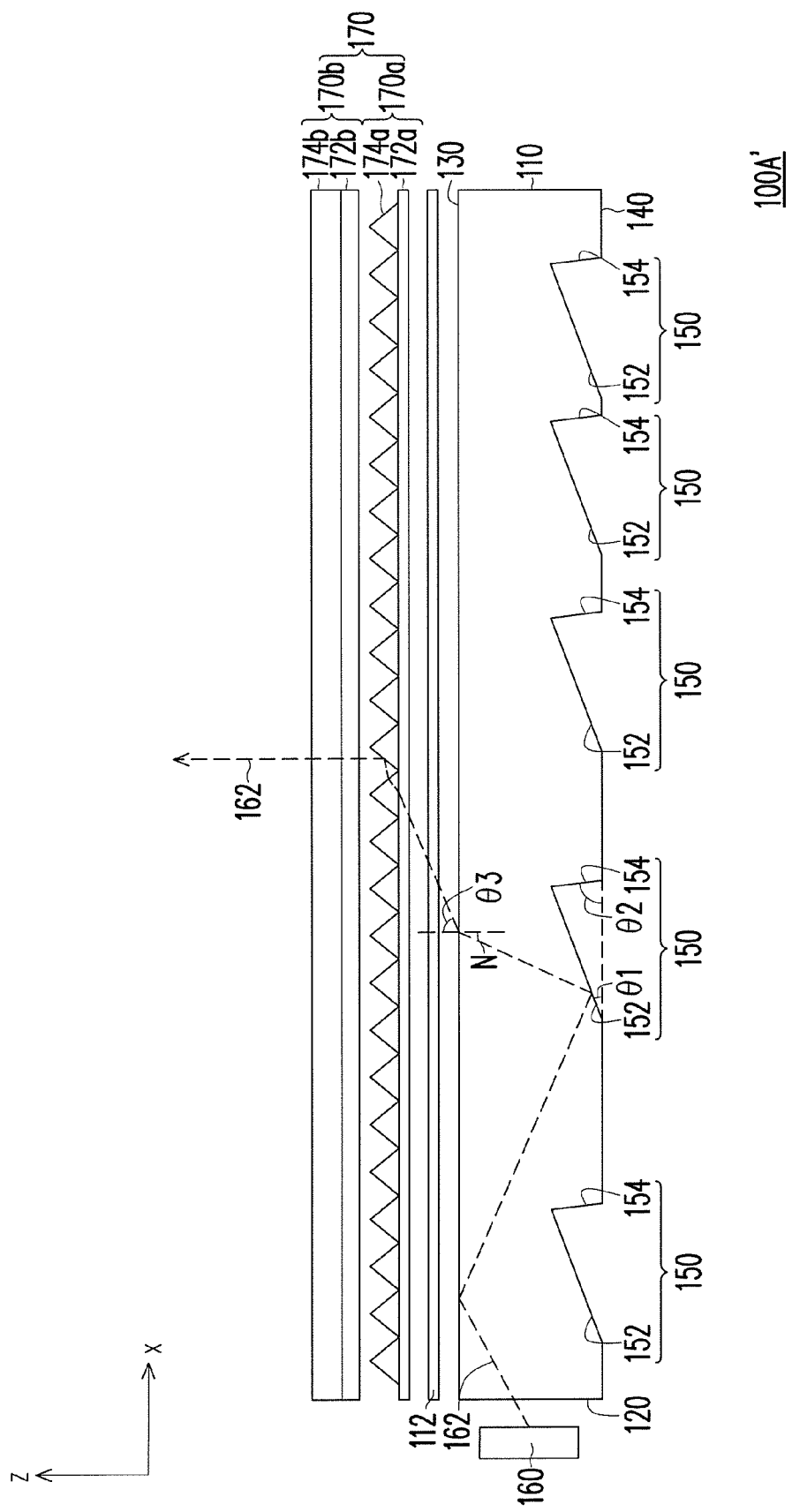
FIG. 1D is a schematic diagram of a backlight module according to another embodiment of the invention.

Those skilled in the art could add a diffusion sheet (shown in FIG. 1D) or other optical films to the backlight module 100A according to a design requirement of an actual product with reference of instructions of the embodiment. For example, the backlight module 100A' of FIG. 1D is similar to the backlight module 100A of FIG. 1A, the first surface 152 of the first microstructure 150 of the backlight module 100A' faces to the light incident surface 120, and the included angle $\theta 1$ between the first surface 152 and the bottom surface 140 ranges from 15 degrees to 27 degrees (i.e. the included angle $\theta 1$ is greater than or equal to 15 degrees and smaller than or equal to 27 degrees), which is preferably 21 degrees. Moreover, the included angle $\theta 3$ between the light emitting direction of the light beam 162 emitted from the light emitting surface 130 of the LGP 110 and the normal direction N of the light emitting surface 130 could be greater than 40 degrees, which is preferably greater than 30 degrees. A difference between the backlight module 100A' of FIG. 1D and the backlight module 100A of FIG. 1A is that the backlight module 100A' further includes a diffusion sheet 112, which is disposed between the light emitting surface 130 and the prism sheets 170.

The light source 160 of FIG. 1A is suitable for providing light beam, where the light source 160 is disposed beside the light incident surface 120 of the LGP 110 to facilitate the light beam 162 entering the LGP 110 through the light incident surface 120. In the embodiment, the light source 160 is, for example, a light-emitting diode (LED). However, in other embodiments, the light source 160 could also be a cold cathode fluorescent lamp (CCFL) or other suitable light source. Moreover, in another embodiment, the number of the light sources 160 could be plural, and the light sources 160 are arranged beside the light incident surface 120 along the y-direction.

Figure 1E:
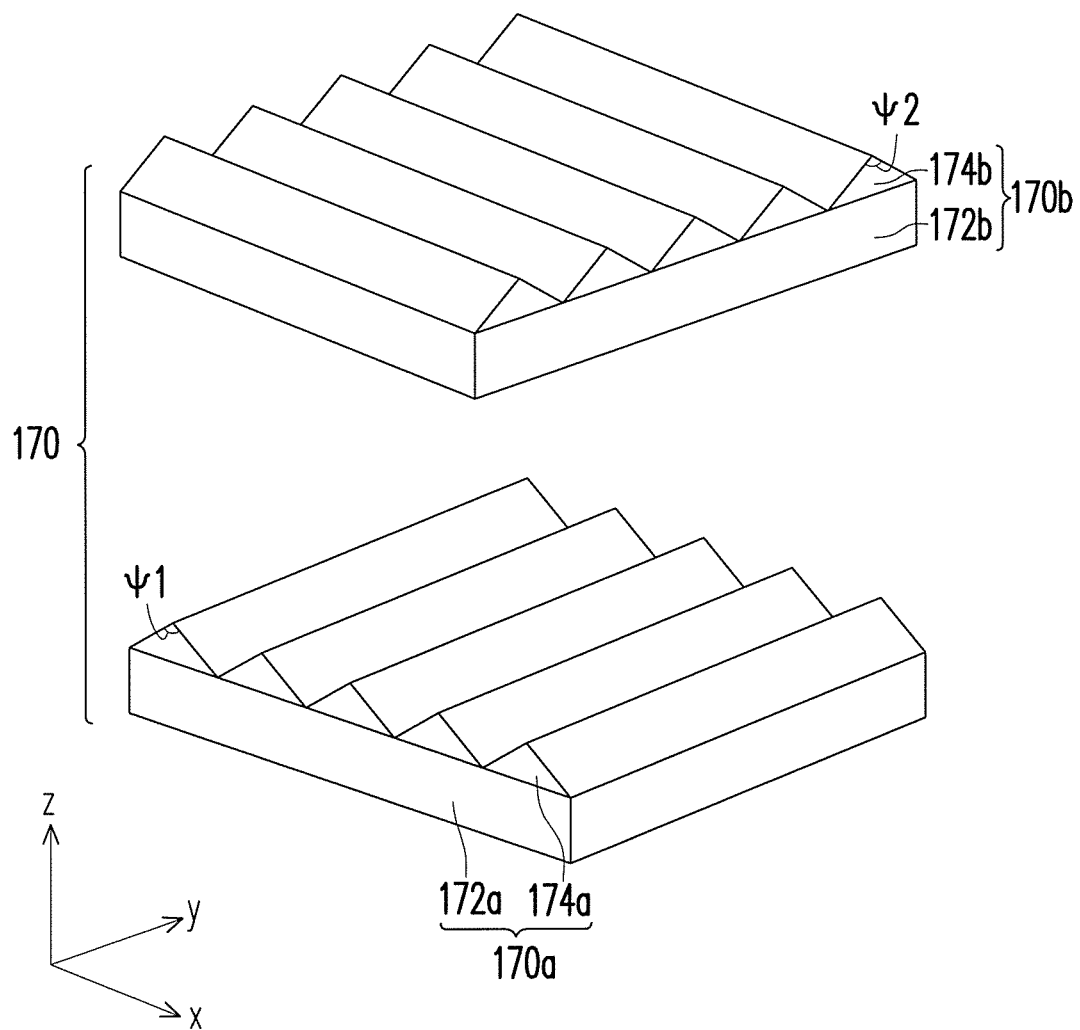
FIG. 1E is a three-dimensional view of prism sheets of the backlight module of FIG. 1A.

FIG. 1E is a three-dimensional view of prism sheets of the backlight module of FIG. 1A. Referring to FIG. 1A and FIG. 1E, the prism sheets 170 of the embodiment includes the first prism sheet 170a and the second prism sheet 170b, where the first prism sheet 170a is disposed between the LGP 110 and the second prism sheet 170b. Moreover, the first prism sheet 170a includes a plurality of first strip prism portions 174a parallel to each other. The second prism sheet 170b includes a plurality of second strip prism portions 174b parallel to each other, where an extending direction of the first strip prism portions 174a is substantially perpendicular to an extending direction of the second strip prism portions 174b.

To be specific, the first strip prism portions 174a extends along the y-axis, and the first strip prism portions 174a are arranged along the x-axis. In detail, each of the first strip prism portions 174a has a protruding first vertex angle ψ1, and the first vertex angle ψ1 ranges from 85 degrees to 95 degrees (i.e. the first vertex angle ψ1 is greater than or equal to 85 degrees and smaller than and equal to 95 degrees). In the embodiment, the first strip prism portions 174a are, for example, triangular columnar prisms, and a material of the first strip prism portions 174a is, for example, a transparent material. In this way, the light beam 162 that leaves the LGP 110 through the light emitting surface 130 is transmitted to the first prism sheet 170a, and the light beam 162 passing through the first prism sheet 170a is transmitted to the second prism sheet 170b, so that the light beam 162 is guided to a forward direction by the first strip prism portions 174a and the second strip prism portions 174b. Therefore, the backlight module 100A may have a better forward luminance (i.e. a luminance measured along the normal direction N of the light emitting surface 130).

In the embodiment, each of the second strip prism portions 174b of the second prism sheet 170b extends along the x-axis, and the second strip prism portions 174b are arranged along the y-axis. In detail, each of the second strip prism portions 174b has a protruding second vertex angle ψ2, and the second vertex angle ψ2 ranges from 85 degrees to 95 degrees (i.e. the second vertex angle ψ2 is greater than or equal to 85 degrees and smaller than and equal to 95 degrees). In the embodiment, the second strip prism portions 174b are, for example, triangular columnar prisms, and a material of the second strip prism portions 174b is, for example, a transparent material.

Moreover, each of the prism sheets may include a transparent substrate to facilitate forming strip prism portions thereon. In the embodiment, the first prism sheet 170a includes a transparent substrate 172a, where the transparent substrate 172a is located between the light emitting surface 130 and the first strip prism portions 174a. Similarly, the second prism sheet 170b includes a transparent substrate 172b, where the transparent substrate 172b is located between the first strip prism portions 174a and the second strip prism portions 174b. Moreover, a material of the transparent substrate 172a and the transparent substrate 172b is, for example, a transparent material.

Referring to FIG. 1A, in the LGP 110 and the backlight module 100A of the embodiment, since the first microstructures 150 having the first surfaces 152 and the second surfaces 154 are used, in collaboration with the first surfaces 152 and the second surfaces 154, the LGP 110 could effectively guide the light beam to a direction capable of being fully used by the prism sheets 170. In detail, after the light beam 162 emitted from the light source 160 enters the LGP 110 through the light incident surface 120, when the light beam 162 is transmitted to the first surface 152, the light beam 162 could be guided to the light emitting surface 130 by the first surface 152. On the other hand, when a light beam 162' is refracted by the first surface 152 and transmitted to the second surface 154, a part of light beam 162" penetrates through the second surface 154 due to a small incident angle and is transmitted to the first surface 152 of the next first microstructure 150, and is then guided to the light emitting surface 130 by the first surface 152 of such first microstructure 150. Namely, the light beam 162 and the light beam 162" are all guided to the light emitting surface 130 by the first microstructures 150, and are transmitted to the prism sheets 170, where the included angle θ3 between the light emitting direction of the light beam 162 and 162" emitted from the light emitting surface 130 of the LGP 110 and the normal direction N of the light emitting surface 130 could be greater than 40 degrees, which is preferably greater than 30 degrees. Moreover, the prism sheets 170 (including the first prism sheet 170a and the second prism sheet 170b) may converge a light emitting angle of the light beam 162 and 162" emitted from the light emitting surface 130, so as to enhance the forward luminance of the backlight module 100A. In this way, the first microstructures 150 could spoil a total reflection of the light beam 162 and 162" through the first surfaces 152 and the second surfaces 154, and after the light beam 162 and 162" emits out from the light emitting surface 130 and leave the LGP 110, the light beam 162 and 162" could be further guided by the prism sheets 170 to converge along a direction parallel to the normal direction N of the light emitting surface 130. As shown in FIG. 1D, a diffusion sheet 112 could be selectively disposed above the light emitting surface 130 of the LGP 110 to enhance uniformity of the light beam 162 and 162". Therefore, the backlight module 100A' of the embodiment could provide a planar light source with higher uniformity and higher forward luminance.

Figure 1F:
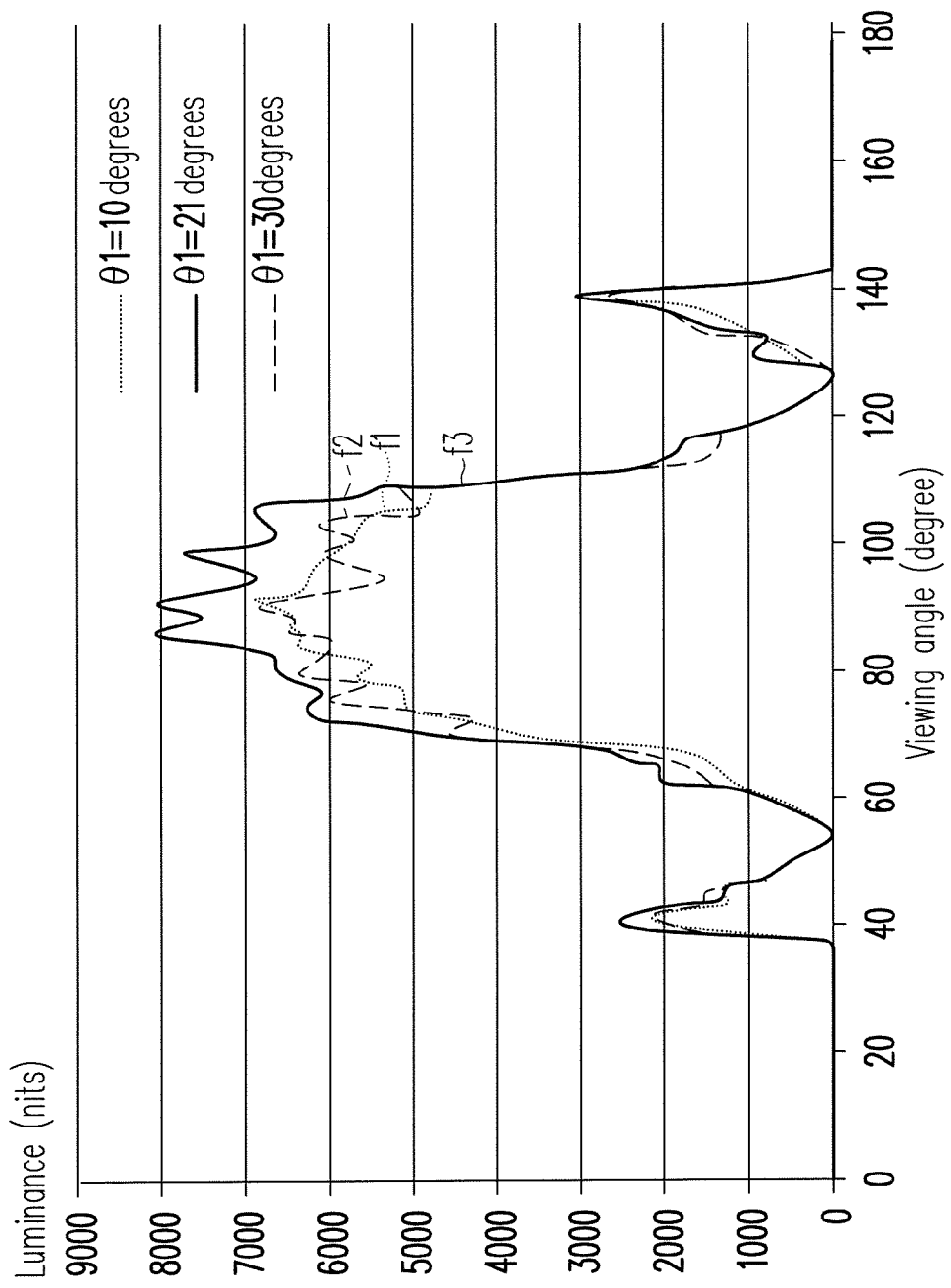
FIG. 1F is a comparison diagram of luminance distributions of first microstructures of the backlight module of FIG. 1D under different included angles θ1 between a first surface and a bottom surface.

In order to describe a variation of luminance distribution corresponding to different first microstructures 150 in the backlight module, FIG. 1F is a comparison diagram of luminance distributions of the first microstructures 150 of the backlight module 100A' of FIG. 1D under different included angles θ1 between the first surface 152 and the bottom surface 150, where a vertical axis and a horizontal axis of FIG. 1F respectively represent luminance and viewing angle. It should be noticed that the normal direction N of the light emitting surface 130 is defined as 90 degrees, a direction parallel to the light emitting surface 130 and pointing to the light source 160 is defined as 0 degree, and a direction parallel to the light emitting surface 130 and pointing away from the light source 160 is defined as 180 degree, and 0-180 degrees are viewing angles of the light emitting surface 130 of the LGP 110. Moreover, a measuring point of the viewing angles is at the center of the light emitting surface 130. In FIG. 1F, dot lines f1, f2, and a solid line f3 respectively represent luminance distributions corresponding to included angles θ1 of 10 degrees, 21 degrees, and 30 degrees between the first surface 152 and the bottom surface 140. According to FIG. 1F, comparing the luminance distributions corresponding to the different included angles θ1 (10 degrees, 21 degrees, and 30 degrees), it is known that when the included angles θ1 between the first surface 152 and the bottom surface 140 is 10 degrees (shown by the dot line f1) and 30 degrees (shown by the dot line f2), the backlight module 100A' has weaker light energy distribution along the viewing angle of 90 degrees. When the included angles θ1 between the first surface 152 and the bottom surface 140 is 21 degrees (shown by the solid line f3), the backlight module 100A' has convergent and higher light energy distribution along the viewing angle of 90 degrees. Therefore, when the included angles θ1 between the first surface 152 and the bottom surface 140 ranges from 15 degrees to 27 degrees, the backlight module 100A' of the embodiment has better forward luminance.

FIGS. 2A-2F are schematic diagrams of a plurality of variations of the first microstructure 150 of FIG. 1A. Referring to FIG. 1A and FIGS. 2A-2F, in the embodiment, a profile of the first surface 152 and the second surface 154 on the x-z plane could be a straight line, a curve or a fold line. For example, in FIG. 2A, a profile of a first surface 152a of a first microstructure 150a is a fold line, and a profile of a second surface 154a is a straight line. In FIG. 2B, a profile of a first surface 152b of a first microstructure 150b is a straight line, and a profile of a second surface 154b is a fold line. In FIG. 2C and FIG. 2D, profiles of first surfaces 152c and 152d are curves, and profiles of second surfaces 154c and 154d are straight lines. In FIG. 2E, a profile of a first surface 152e of a first microstructure 150e is a curve, and a profile of a second surface 154e is a fold line. In FIG. 2F, a profile of a first surface 152f of a first microstructure 150f is a fold line, and a profile of a second surface 154f is a curve.

Figure 3A:
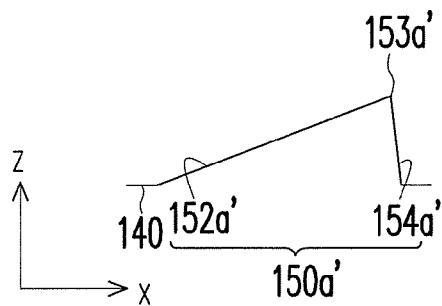
FIGS. 3A-3D are schematic diagrams of a plurality of variations of a first microstructure of FIG. 1A.
Figure 3B:
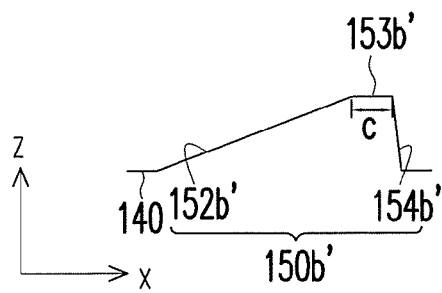
Figure 3C:
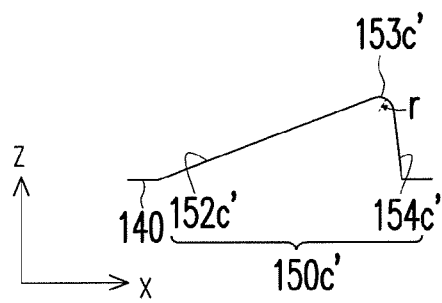
Figure 3D:
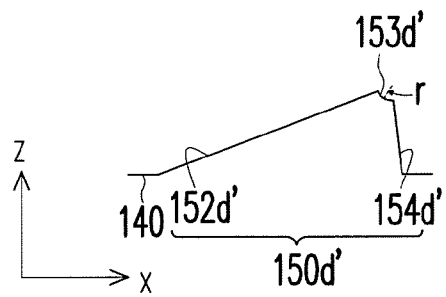

FIGS. 3A-3D are schematic diagrams of a plurality of variations of the first microstructure 150 of FIG. 1A. Referring to FIG. 1A and FIGS. 3A-3D, a junction of the first surface 152 and the second surface 154 may form an intersection, a straight line, a convex curve or a concave curve. For example, in FIG. 3A, a junction of a first surface 152a' and a second surface 154a' of a first microstructure 150a' may form an intersection 153a'. In FIG. 3B, a junction of a first surface 152b' and a second surface 154b' of a first microstructure 150b' may form a straight line 153b', and a width C of the straight line 153b', for example, ranges from 0.5 μm to 10 μm. In FIG. 3C, a junction of a first surface 152c' and a second surface 154c' of a first microstructure 150c' may form a convex curve 153c', where a radius of curvature r of the curve 153c', for example, ranges from 0.1 μm to 3 μm. In FIG. 3D, a junction of a first surface 152d' and a second surface 154d' of a first microstructure 150d' may form a concave curve 153d', where a radius of curvature r of the concave curve 153d' is, for example, greater than 0.1 μm and smaller than or equal to 3 μm.

FIGS. 4A-12A are top views of a plurality of variations of the first microstructure of FIG. 1B, and FIGS. 4B-12B are three-dimensional views of a plurality of variations of the first microstructure of FIG. 1B. Referring to FIG. 1A and FIGS. 4A-12B, the first surface 152 and the second surface 154 of the first microstructure 150 could extend along a path, where the path could be composed of at least one straight line or at least one curve, and the path could also be composed of at least one straight line and at least one curve. When the LGP 110 is viewed from a top view through the light emitting surface 130, a shape of each of the first microstructures 150 could be composed of at least one quadrilateral or at least one arc (i.e. at least two parallel arcs and two parallel lines) or at least one fan, and the shape of each of the first microstructures 150 could also be composed of at least one quadrilateral and at least one arc. Moreover, a width W of the first microstructure 150, for example, ranges from 5 μm to 200 μm.

Figures 7A, 7B:
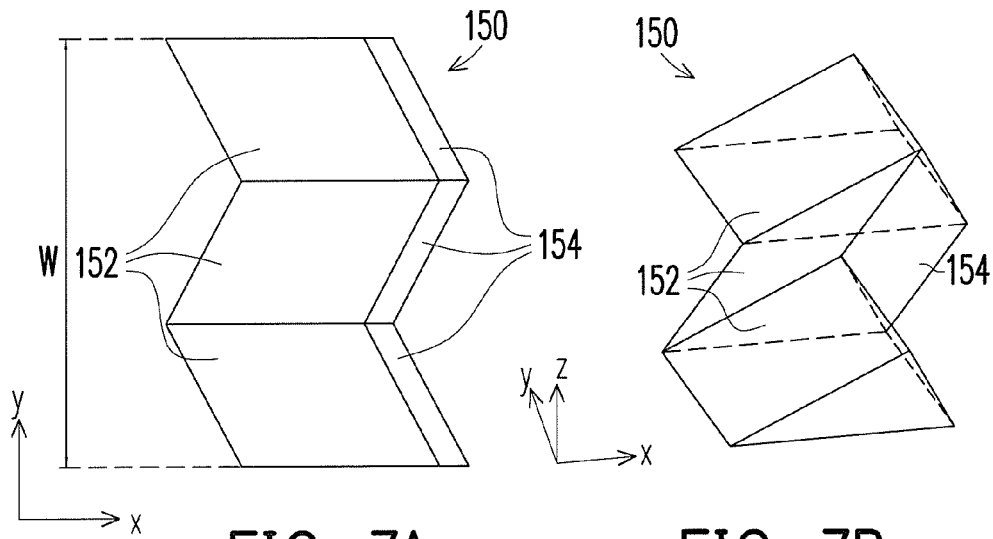

For example, in FIG. 4A and FIG. 4B, the first surface 152 and the second surface 154 extend along a path formed by a straight line to a direction (for example, the y-axis direction) parallel to the bottom surface 140, and when the LGP 110 is viewed from the top view through the light emitting surface 130, a shape of the first microstructure 150 is, for example, a quadrilateral. In FIG. 5A-7A and FIG. 5B-7B, the first surface 152 and the second surface 154 extend along a path formed by a fold line to a direction parallel to the bottom surface 140, and when the LGP 110 is viewed from the top view through the light emitting surface 130, a shape of the first microstructure 150 is, for example, composed of at least two quadrilaterals. Namely, when the LGP 110 is viewed from the top view through the light emitting surface 130, the shapes of the first microstructures 150 of FIG. 5A and FIG. 6A are respectively composed of two quadrilaterals, and the shape of the first microstructure 150 of FIG. 7A is composed of three quadrilaterals.

Figures 8A, 8B:
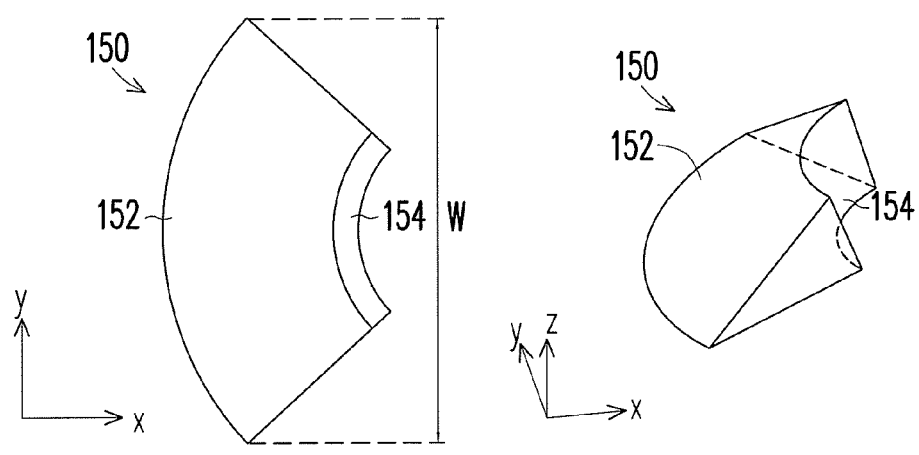
Figures 9A, 9B:
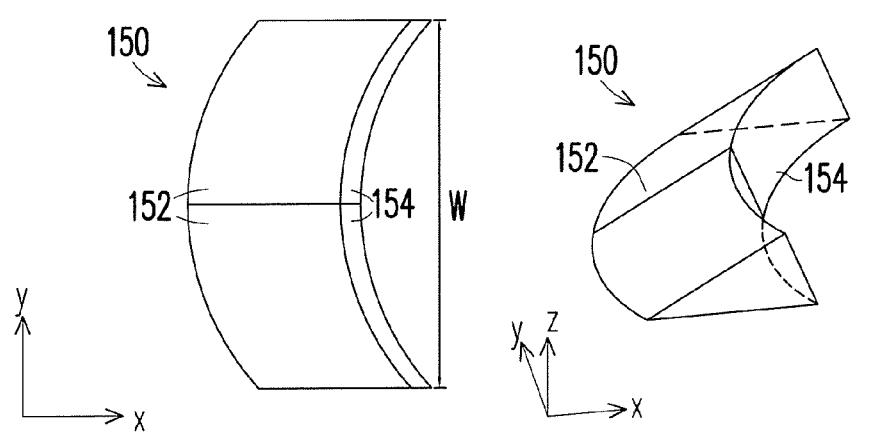
Figures 10A, 10B:
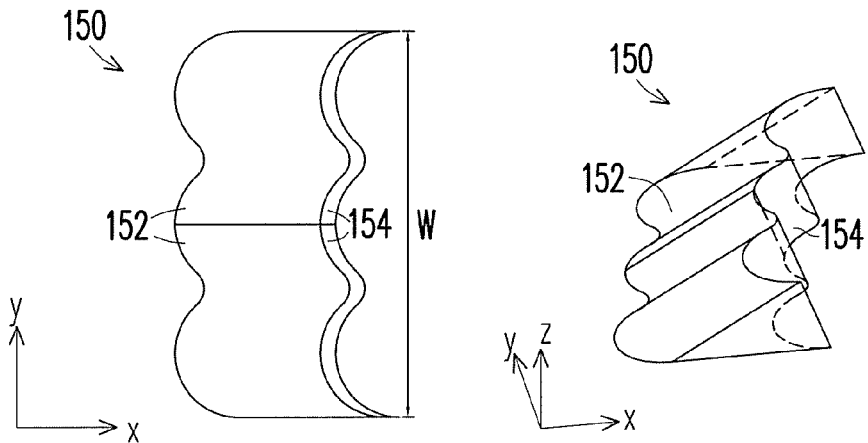
Figures 11A, 11B:
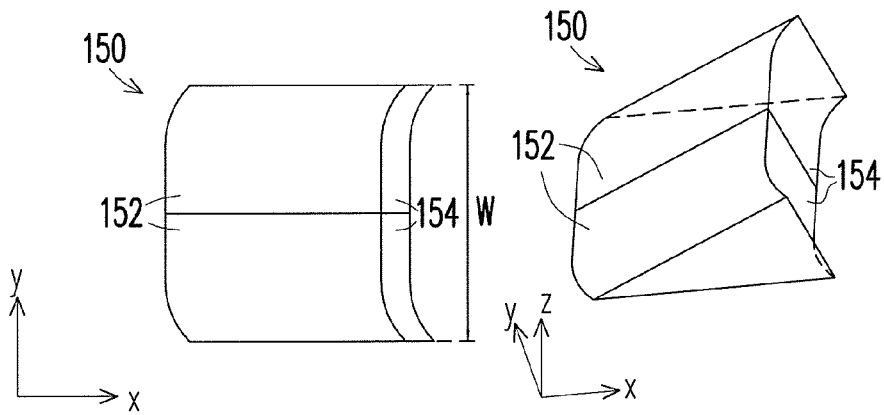
Figures 12A, 12B:
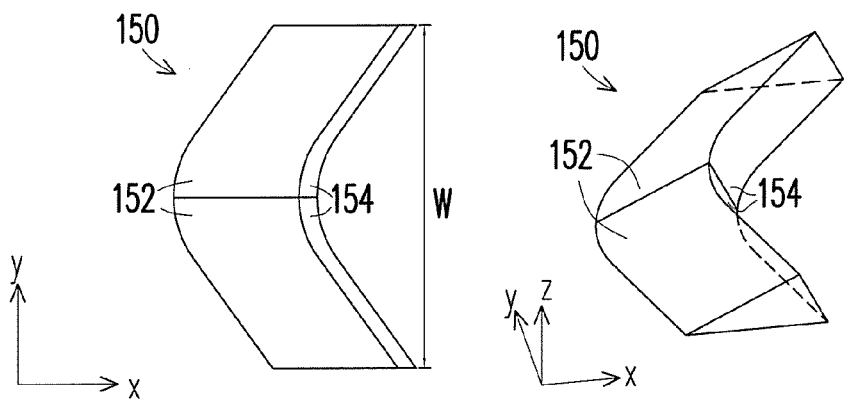

In FIG. 8A-9A and FIG. 8B-9B, the first surface 152 and the second surface 154 extend along a path formed by a curve to a direction parallel to the bottom surface 140, and when the LGP 110 is viewed from the top view through the light emitting surface 130, a shape of the first microstructure 150 is, for example, composed of at least one fan or an arc. Namely, when the LGP 110 is viewed from the top view through the light emitting surface 130, the shape of the first microstructure 150 of FIG. 8A and FIG. 8B is composed of a fan, and the shape of the first microstructure 150 of FIG. 9A and FIG. 9B is composed of an arc, and the arc is composed of two parallel arc lines and two parallel lines. In FIG. 10A and FIG. 10B, the first surface 152 and the second surface 154 extend along a path formed by a curve to a direction parallel to the bottom surface 140, and when the LGP 110 is viewed from the top view through the light emitting surface 130, a shape of the first microstructure 150 is, for example, composed of an arc, and the arc is composed of three parallel arc lines and two parallel lines. In FIG. 11A to FIG. 12B, the first surface 152 and the second surface 154 extend along a path formed by a curve and a straight line to a direction parallel to the bottom surface 140, and when the LGP 110 is viewed from the top view through the light emitting surface 130, a shape of the first microstructure 150 is, for example, composed of arcs and quadrilaterals.

Figure 13A:
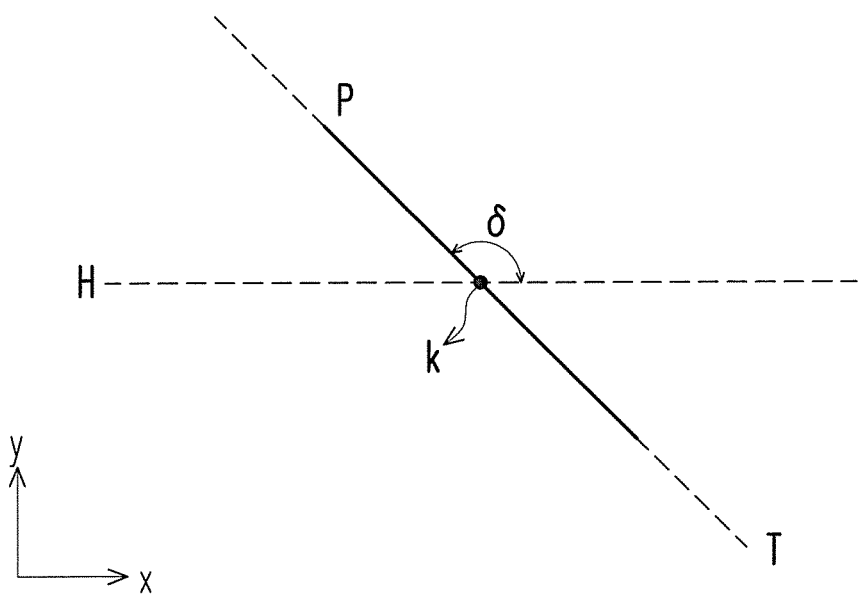
FIG. 13A and FIG. 13B are diagrams describing an extending principle of a first surface and a second surface of FIGS. 4A-12B.
Figure 13B:
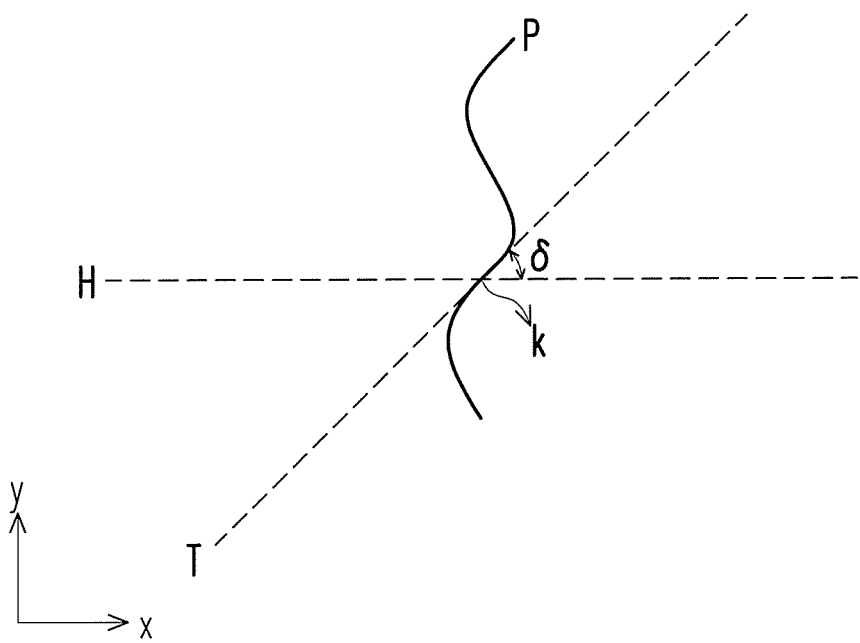

FIG. 13A and FIG. 13B are diagrams describing an extending principle of the first surface and the second surface of FIGS. 4A-12B. Referring to FIG. 13A and FIG. 13B, a line P represents an extending direction of the first surface 152 and the second surface 154 along a direction parallel to the bottom surface 140 (i.e. parallel to the x-y plane), a reference line H is parallel to the x-direction, and a tangent line T is a tangent of a point K on the line P. In the embodiment, an included angle δ between the tangent line T of any point K on the line P and the reference line H ranges from 0 degree to 180 degrees.

Figure 14A:
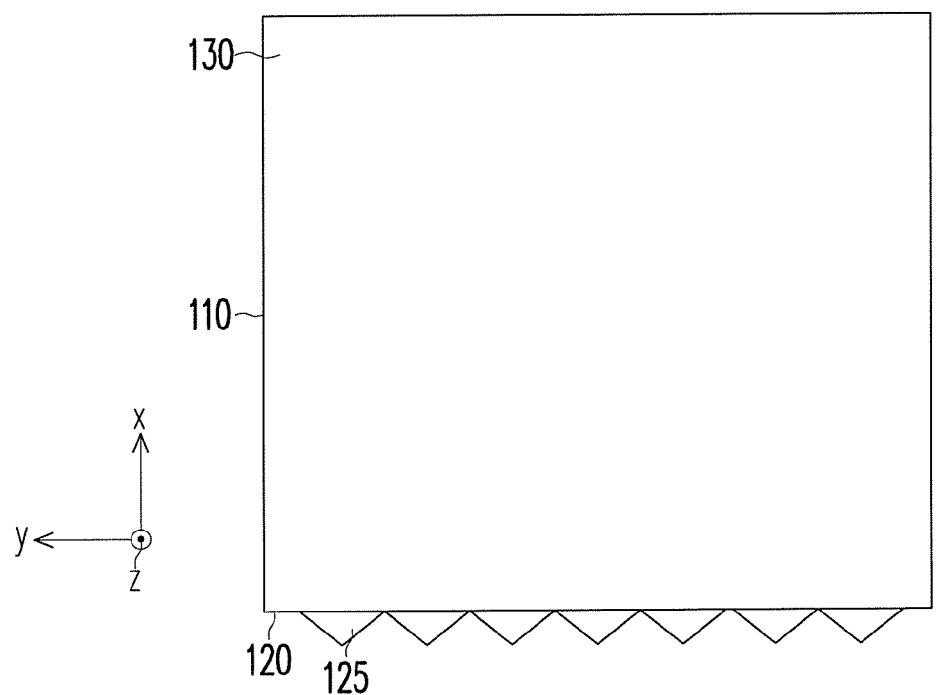
FIG. 14A is a top view of a light guide plate (LGP) of a backlight module according to another embodiment of the invention.
Figure 14B:
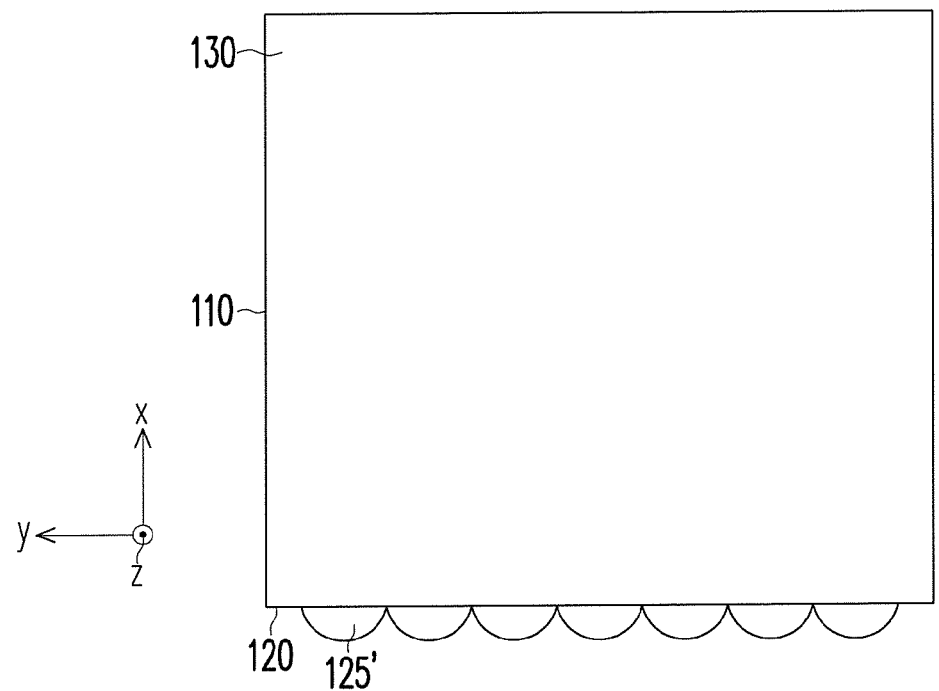
FIG. 14B is a top view of a LGP of a backlight module according to another embodiment of the invention.
Figure 14C:
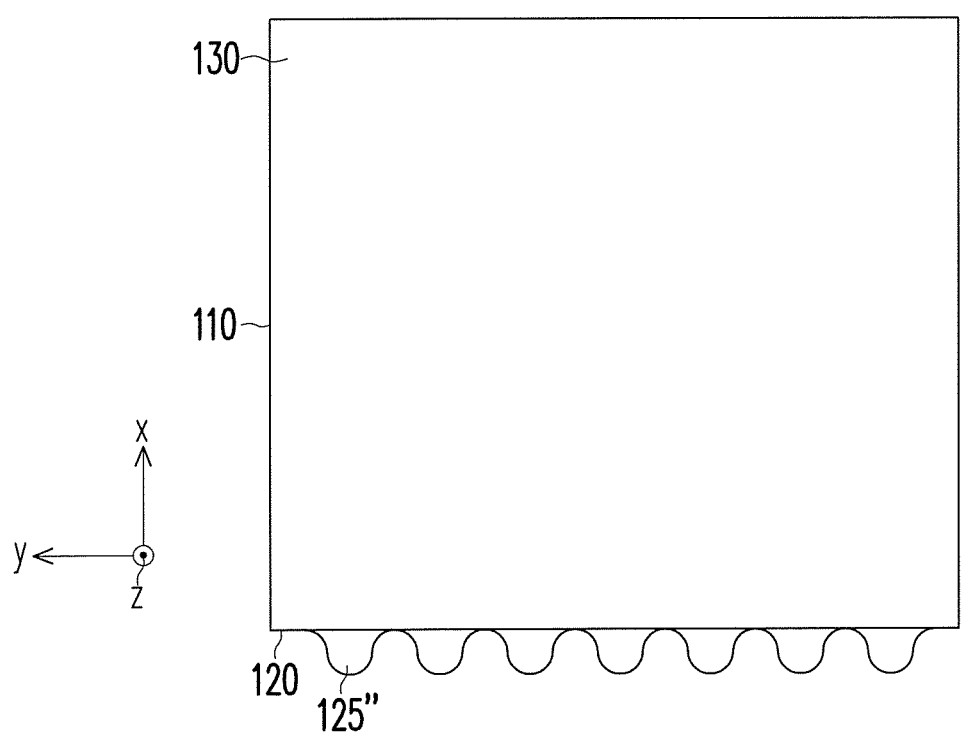
FIG. 14C is a top view of a LGP of a backlight module according to another embodiment of the invention.

FIG. 14A is a top view of the LGP of a backlight module according to another embodiment of the invention. Referring to FIG. 14A, the LGP 110 of the embodiment is similar to the LGP 110 of FIG. 1A, and a difference there between is that the LGP 110 of the embodiment further includes a plurality of second microstructures 125. The second microstructures 125 are disposed on the light incident surface 120, where each of the second microstructures 125 extends along a direction (i.e. a z-axis direction) substantially perpendicular to the light emitting surface 130, and the second microstructures 125 are arranged along a direction (i.e. a y-axis direction) substantially parallel to the light emitting surface 130. Moreover, as shown in FIG. 14A, the second microstructure 125 of the embodiment, for example, presents a triangular columnar shape. However, in other embodiments, as shown in FIG. 14B, the second microstructure 125' presents a semi-circular cylindrical shape. Alternatively, as shown in FIG. 14C, the second microstructure 125" could also present an aspheric cylindrical lens shape. The second microstructures 125, 125', and 125" may enhance light incident efficiency of the light beam 162 that enters the LGP 110 through the light incident surface 120. Furthermore, the second microstructures 125 disposed on the light incident surface 120 could also be applied to other embodiments of the invention and achieve the same effect, though the invention is not limited thereto.

Figure 15A:
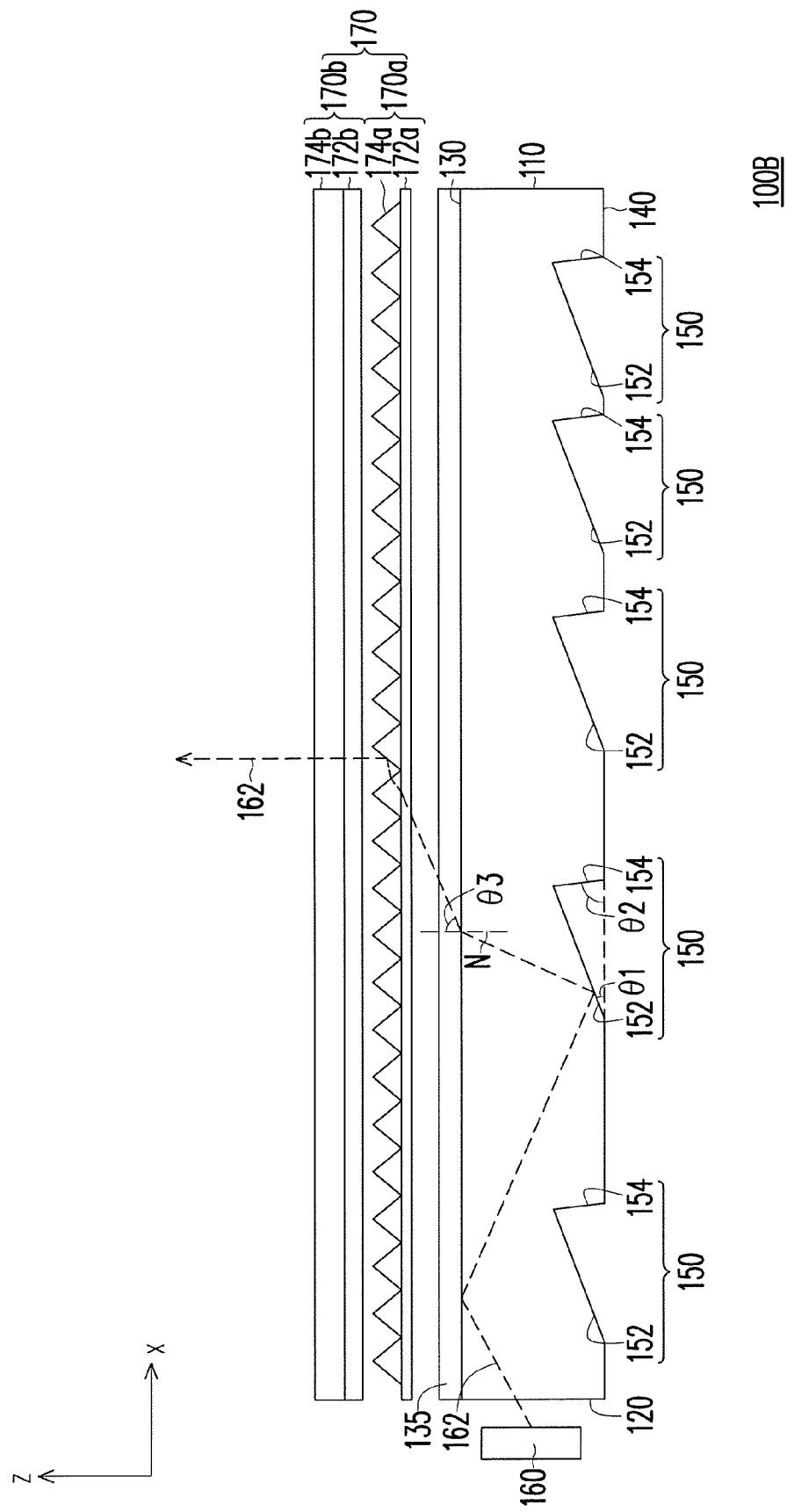
FIG. 15A is a schematic diagram of a backlight module according to another embodiment of the invention.
Figure 15B:
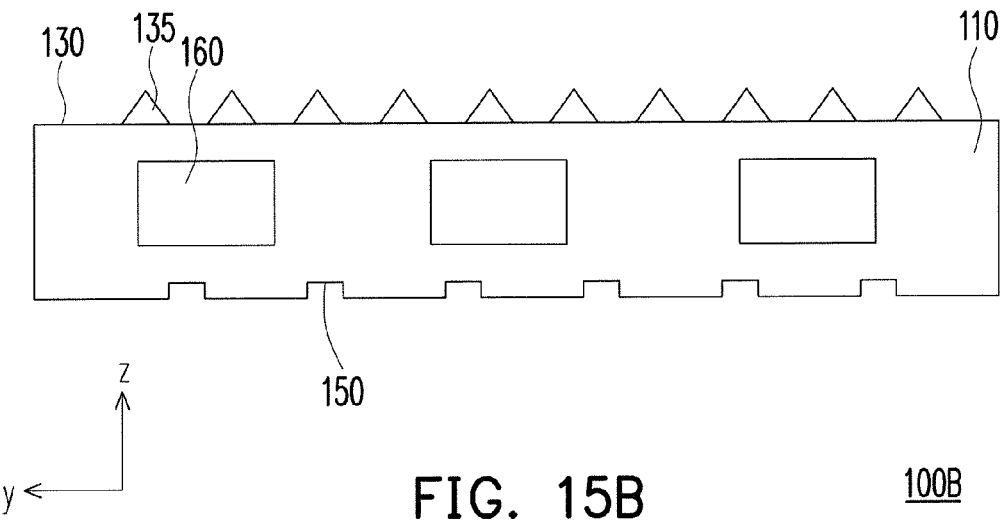
FIG. 15B is a schematic diagram of the backlight module of FIG. 15A viewed from another viewing angle.

FIG. 15A is a schematic diagram of a backlight module according to another embodiment of the invention, and FIG. 15B is a schematic diagram of the backlight module of FIG.

Figure 15C:
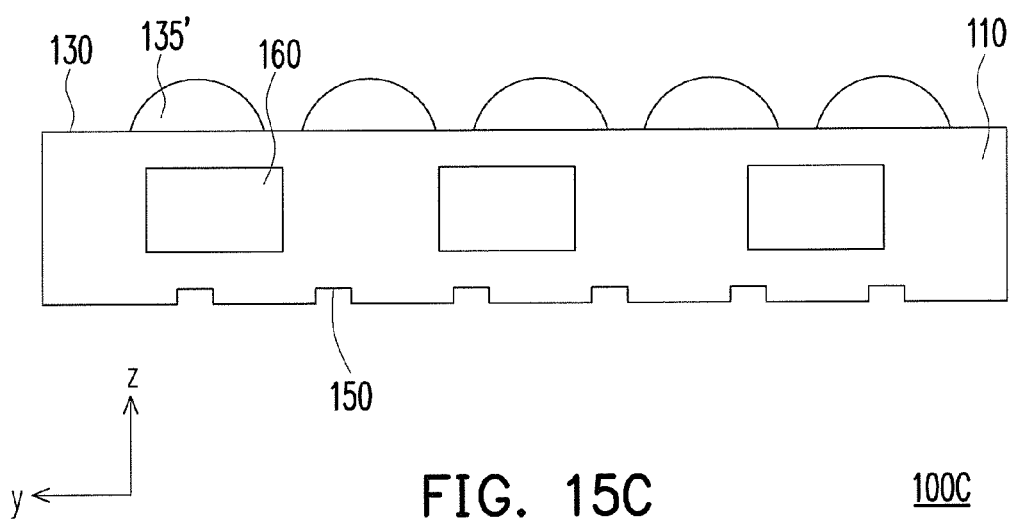
FIG. 15C is a schematic diagram of a backlight module according to another embodiment of the invention.
Figure 15D:
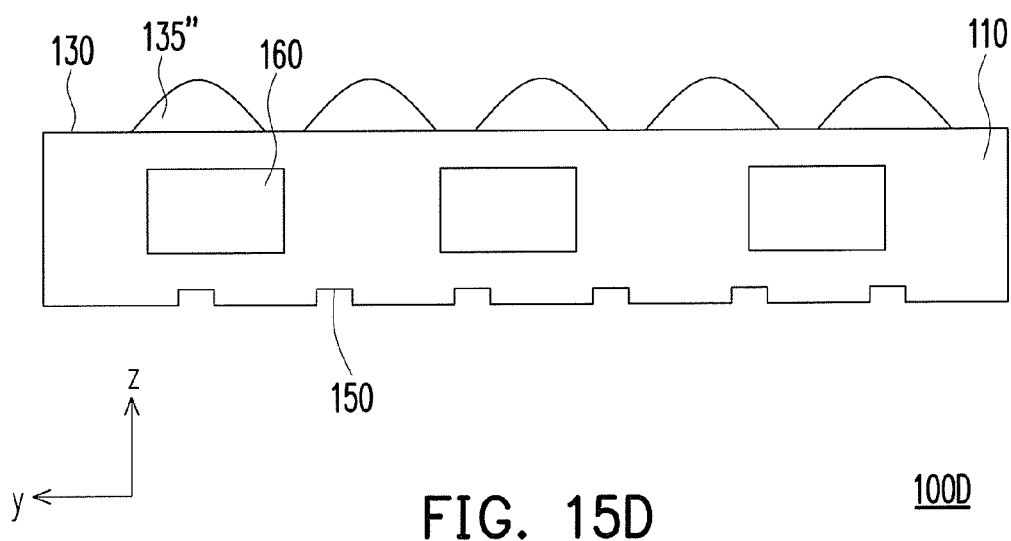
FIG. 15D is a schematic diagram of a backlight module according to another embodiment of the invention.

15A viewed from another viewing angle. The backlight module 100B of the embodiment is similar to the backlight module 100A of FIG. 1A, and a difference there between is that the LGP 110 of the backlight module 100B of the embodiment further includes a plurality of third microstructures 135. The third microstructures 135 are disposed on the light emitting surface 130, where each of the third microstructures 135 extends a long a direction (i.e. the x-axis direction) substantially perpendicular to the light incident surface 120, and the third microstructures 135 are arranged along a direction (i.e. the y-axis direction) substantially parallel to the light incident surface 120. Moreover, as shown in FIG. 15B, the third microstructure 135 of the backlight module 100B, for example, presents a triangular columnar shape. However, in other embodiments, shown as a backlight module 100C of FIG. 15C, the third microstructure 135' presents a semi-circular cylindrical shape. Alternatively, shown as a backlight module 100D of FIG. 15D, the third microstructure 135" could also present an aspheric cylindrical lens shape. The third microstructures 135, 135', and 135" may enhance light emitting efficiency of the light beam 162 that leaves the light emitting surface 130. Furthermore, the third microstructures 135 disposed on the light emitting surface 130 could also be applied to other embodiments of the invention and achieve the same effect, though the invention is not limited thereto.

Figure 16:
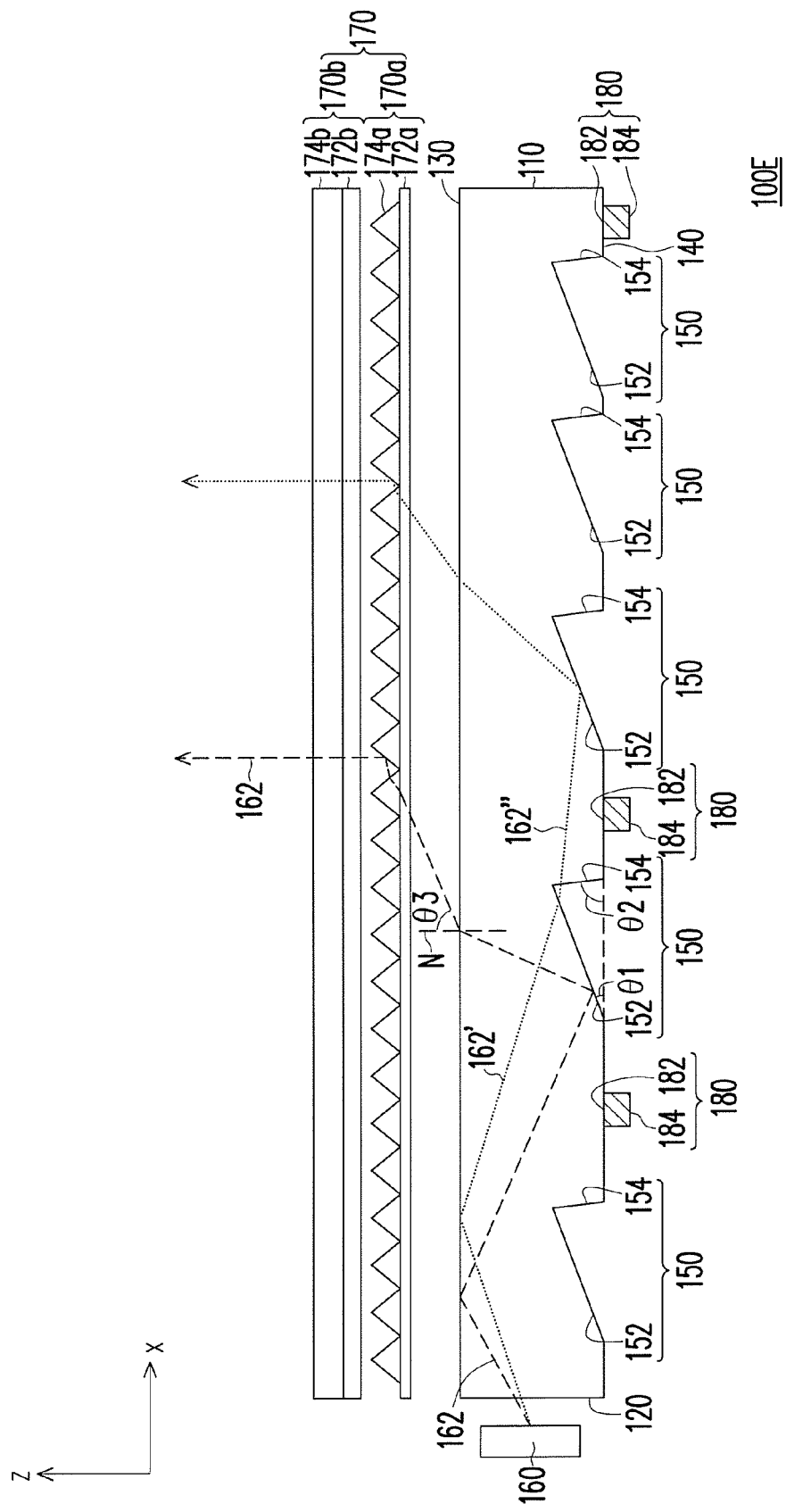
FIG. 16 is a schematic diagram of a backlight module according to another embodiment of the invention.

FIG. 16 is a schematic diagram of the backlight module according to another embodiment of the invention. Referring to FIG. 16, the backlight module 100E of the embodiment is similar to the backlight module 100A of FIG. 1A, and a difference there between is that the LGP 110 of the backlight module 100E of the embodiment further includes a plurality of fourth microstructures 180 disposed on the bottom surface 140 in dispersion. Each of the fourth microstructures 180 is a protruding structure and has a third surface 184, where the fourth microstructures 180 are attached to the bottom surface 140, and the third surface 184 protrudes out from the bottom surface 140. Further, as the fourth microstructures 180 protrude out from the bottom surface 140 of the LGP 110, it is avoided to produce bright spot defects due to electrostatic adsorption of the LGP 110 and a reflection sheet (not shown) disposed under the bottom surface 140 of the LGP 110. Furthermore, the fourth microstructures 180 disposed on the bottom surface 140 could also be applied to other embodiments of the invention and achieve the same effect, though the invention is not limited thereto.

FIGS. 17A-22A are side views of a plurality of variations of the fourth microstructure 180 of FIG. 16, and FIGS. 17B-22B are three-dimensional views of a plurality of variations of the fourth microstructure 180 of FIG. 16. Referring to FIG. 16, FIG. 17A to FIG. 22B, when the LGP 110 is viewed from the top view through the light emitting surface 130, a shape of an orthographic projection 182 of the third surface 184 of each of the fourth microstructures 180 on the bottom surface 140 is, for example, a round, an ellipse or a polygon. A width W' of the orthographic projection 182 of the third surface 184 on the bottom surface 140 ranges from 10 μm to 60 μm. Moreover, the third surface 184 of the fourth microstructure 180 is, for example, a circular arc surface, where a tangent plane tp of the circular arc surface is parallel to the bottom surface 140, and a vertical distance Q between the tangent plane tp and the bottom surface 140 ranges from 3 μm to 10 μm. Alternatively, the third surface 184 of the fourth microstructure 180 has at least one side surface 184a and a supporting bottom surface 184b, where the at least one side surface 184a is a plane or a curved surface, the supporting bottom surface is a curved surface or a plane, and the vertical distance Q between the supporting bottom surface 184b and the bottom surface 140 ranges from 3 μm to 10 μm.

Figures 17A, 17B:
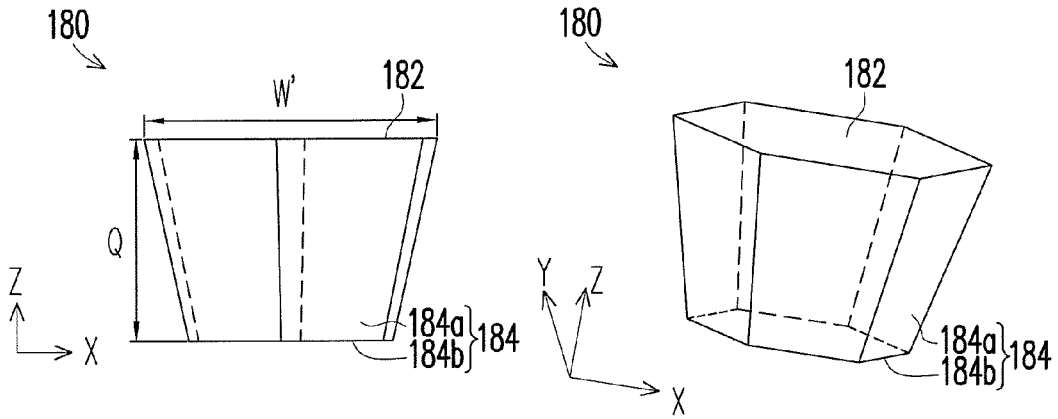
Figures 18A, 18B:
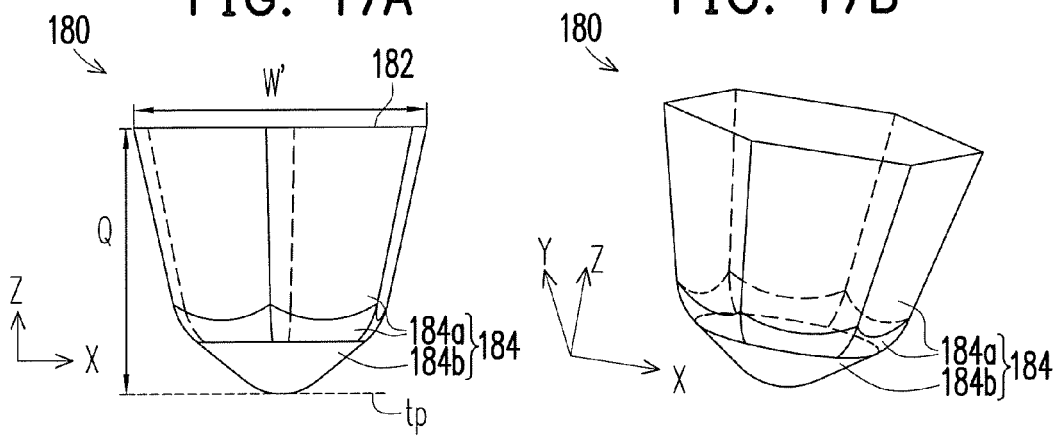
Figures 19A, 19B:
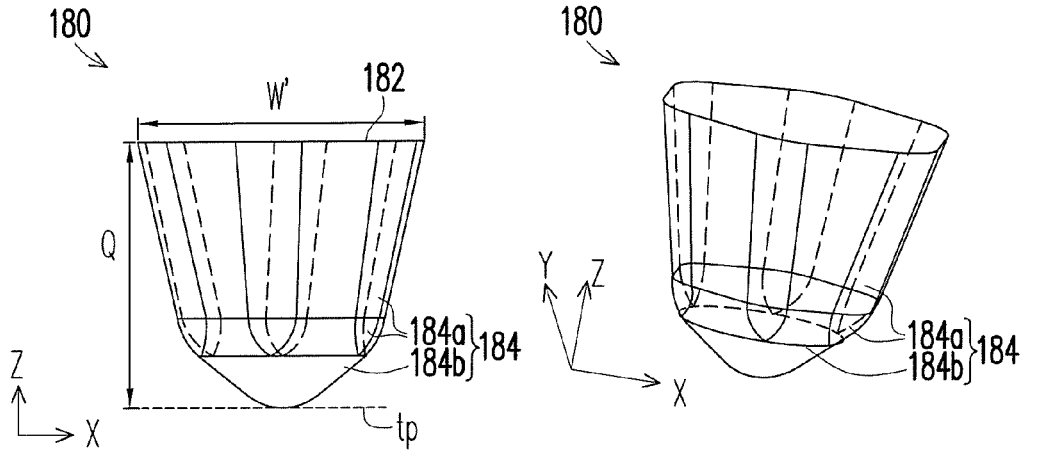

For example, in FIG. 17A and FIG. 17B, when the LGP 110 is viewed from the top view through the light emitting surface 130, a shape of the orthographic projection 182 of the third surface 184 of each of the fourth microstructures 180 on the bottom surface 140 is, for example, a hexagon, and the third surface 184 of the fourth microstructure 180 has six side surfaces 184a and one hexagonal supporting bottom surface 184b, where each of the side surfaces 184a and the supporting bottom surface 184b are respectively a plane. In FIGS. 18A-19B, when the LGP 110 is viewed from the top view through the light emitting surface 130, a shape of the orthographic projection 182 of the third surface 184 of each of the fourth microstructures 180 on the bottom surface 140 is, for example, a polygon, and the third surface 184 of the fourth microstructure 180 has a plurality of side surfaces 184a and the supporting bottom surface 184b, where each of the side surfaces 184a is a plane or a curved surface, and the supporting bottom surface 184b is a curved surface.

In FIG. 20A and FIG. 20B, when the LGP 110 is viewed from the top view through the light emitting surface 130, a shape of the orthographic projection 182 of the third surface 184 of each of the fourth microstructures 180 on the bottom surface 140 is, for example, a round or an ellipse, and the third surface 184 of the fourth microstructure 180 has one side surface 184a and one supporting bottom surface 184b, where the side surface 184a is a tapered cylindrical surface, and the supporting bottom surface 184b is a curved surface. In FIG. 21A and FIG. 21B, when the LGP 110 is viewed from the top view through the light emitting surface 130, a shape of the orthographic projection 182 of the third surface 184 of each of the fourth microstructures 180 on the bottom surface 140 is, for example, a round or an ellipse, and the third surface 184 of the fourth microstructure 180 has one side surface 184a and one supporting bottom surface 184b, where the side surface 184a is a tapered cylindrical surface, and the supporting bottom surface 184b is a circular plane. In other words, the fourth microstructure 180 is a tapered cylinder. In FIG. 22A and FIG. 22B, when the LGP 110 is viewed from the top view through the light emitting surface 130, a shape of the orthographic projection 182 of the third surface 184 of each of the fourth microstructures 180 on the bottom surface 140 is, for example, a round or an ellipse, and the third surface 184 of the fourth microstructure 180 is a curved surface, i.e. the fourth microstructure 180 is dome-shaped.

It should be noticed that the LGP 110 of the embodiment could also include a plurality of second microstructures disposed on the light incident surface 120, where the second microstructures are a triangular columnar shape, a semi-circular cylindrical shape, or an aspheric cylindrical lens shape. Detailed descriptions and effects of the second microstructures have been described in the aforementioned embodiments (referring to related descriptions of FIG. 14A to FIG. 14C), so that details thereof are not repeated.

Figure 23A:
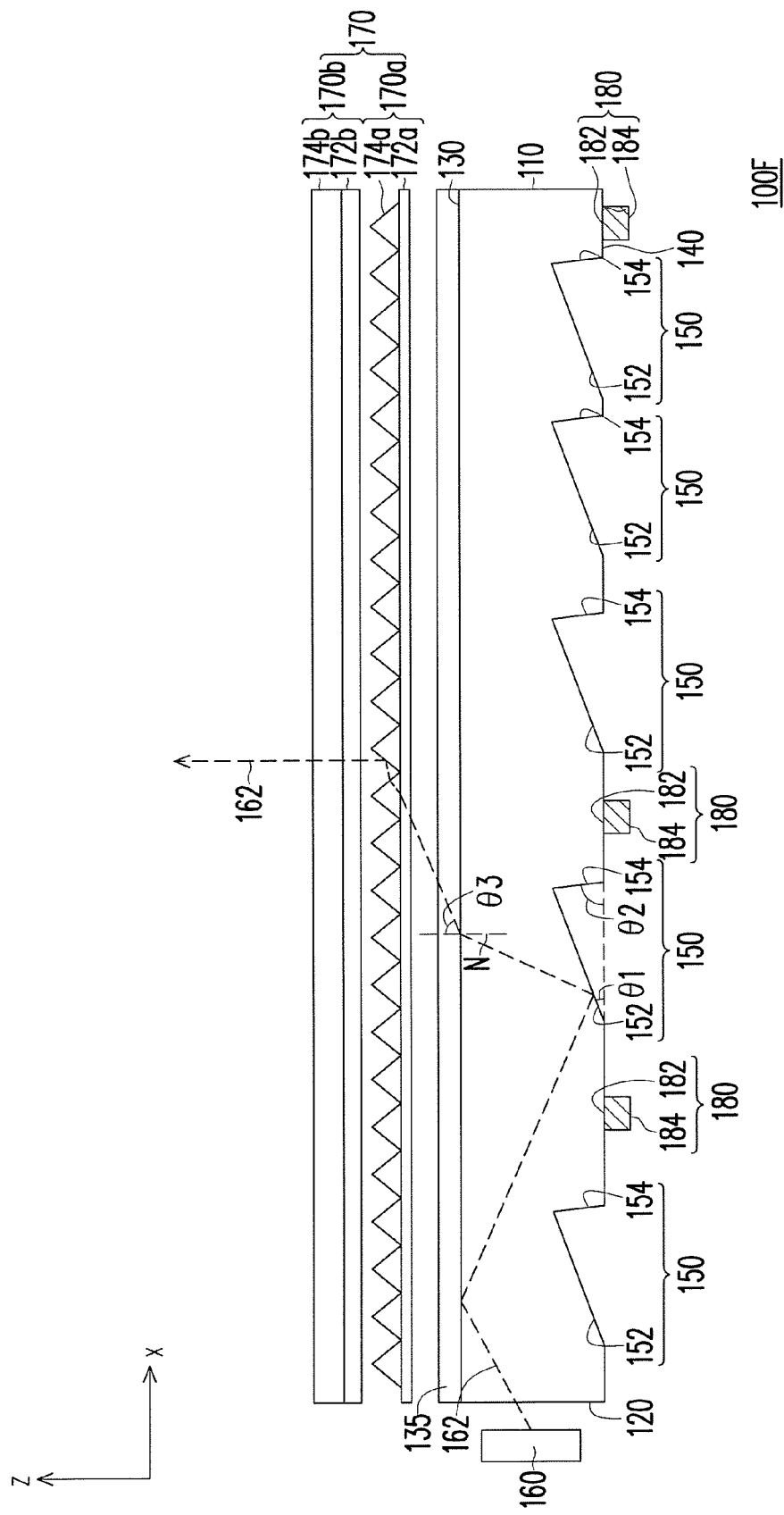
FIG. 23A is a schematic diagram of a backlight module according to still another embodiment of the invention.
Figure 23B:
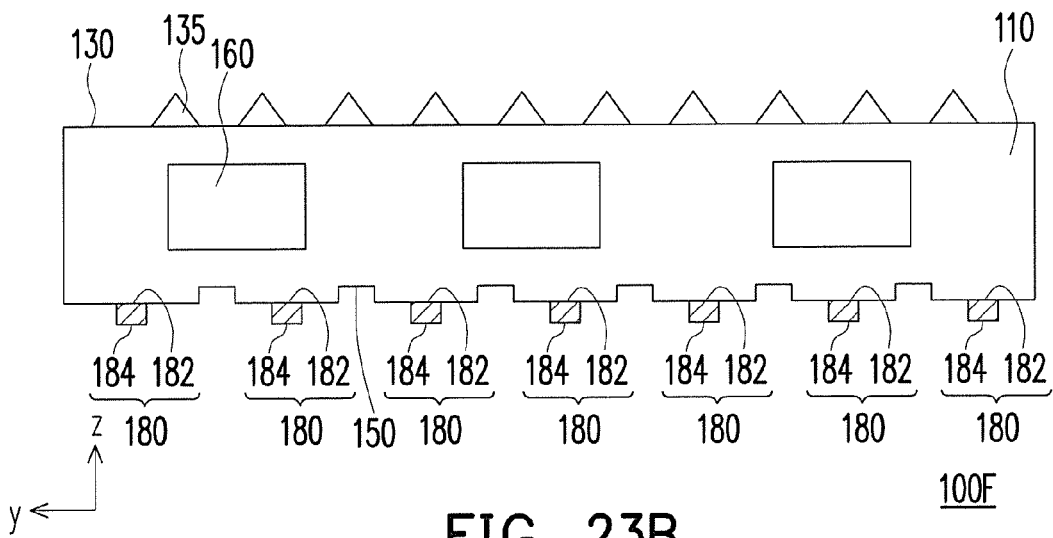
FIG. 23B is a partial schematic diagram of the backlight module of FIG. 23A viewed from another viewing angle.
Figure 23C:
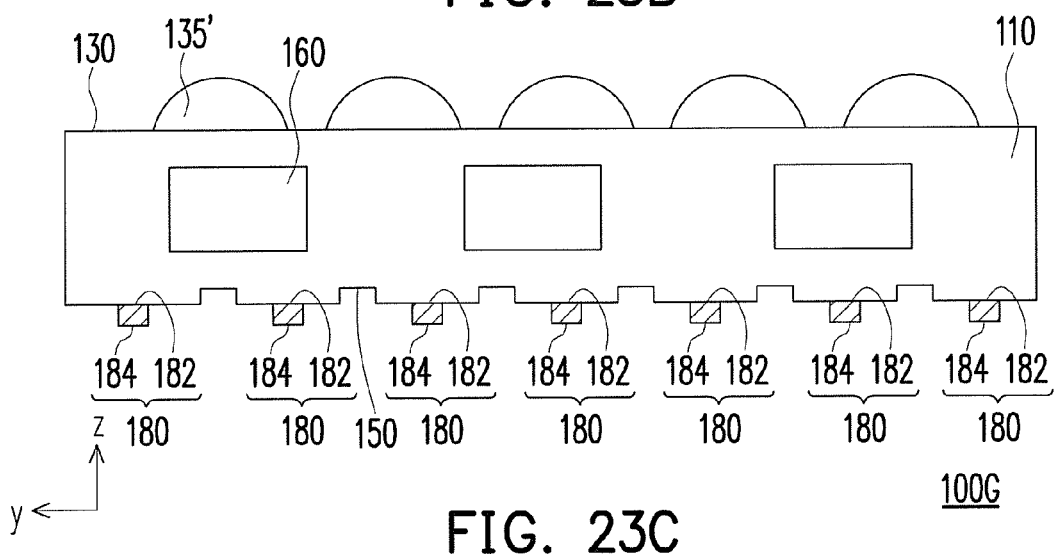
FIG. 23C is a schematic diagram of a backlight module according to still another embodiment of the invention.
Figure 23D:
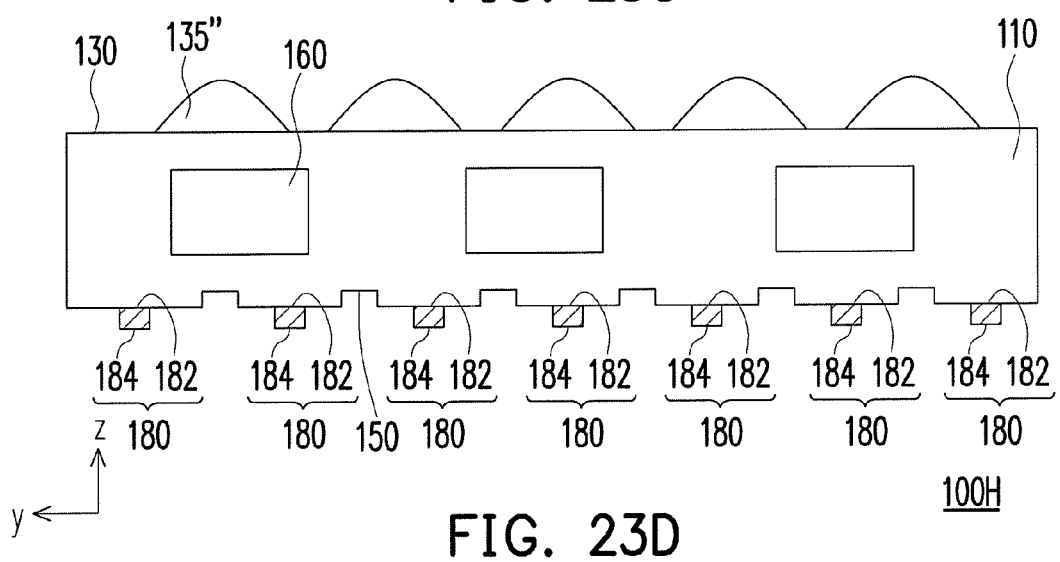
FIG. 23D is a schematic diagram of a backlight module according to still another embodiment of the invention.

FIG. 23A is a schematic diagram of a backlight module according to still another embodiment of the invention, and FIG. 23B is a partial schematic diagram of the backlight module of FIG. 23A viewed from another viewing angle. The backlight module 100F of the embodiment is similar to the backlight module 100E of FIG. 16, and a difference there between is that the LGP 110 of the backlight module 100F of the embodiment further includes a plurality of third microstructures 135 disposed on the light emitting surface 130. As shown in FIG. 23B, the third microstructure 135 of the backlight module 100F, for example, presents a triangular columnar shape. In a backlight module 100G of FIG. 23C, the third microstructure 135' presents a semi-circular cylindrical shape. Alternatively, shown as a backlight module 100H of FIG. 23D, the third microstructure 135" could also present an aspheric cylindrical lens shape. Moreover, detailed descriptions and effects of the third microstructures have been described in the aforementioned embodiments (referring to related descriptions of FIG. 15A to FIG. 15D), so that details thereof are not repeated.

It should be noticed that a distribution density of the fourth microstructures 180 is lower than a distribution density of the first microstructures 150 on the LGP 110. In an embodiment of the invention, a distribution density of the fourth microstructures 180 away from the light incident surface 120 is higher, and a distribution density of the fourth microstructures 180 close to the light incident surface 120 is lower, and a distance between the adjacent fourth microstructures 180 ranges from 30 μm to 500 μm. In another embodiment, the fourth microstructures 180 could be averagely disposed on the bottom surface 140, and the distance between the adjacent fourth microstructures 180 ranges from 100 μm to 500 μm. Alternatively, in another embodiment, the fourth microstructures 180 could also be configured according to a luminance distribution of the backlight module, for example, more fourth microstructures 180 are configured at places with weak light intensity.

Figure 24:
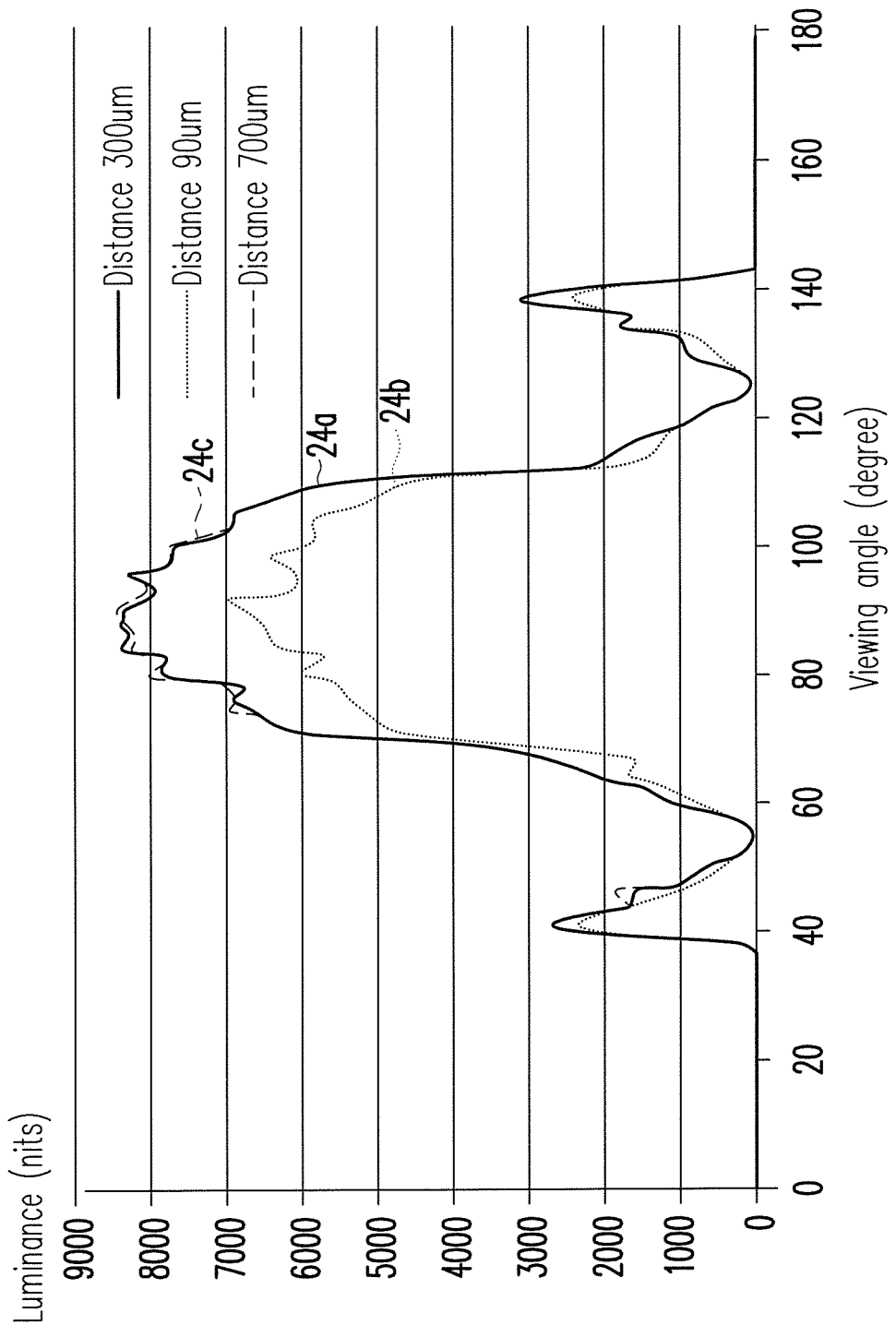
FIG. 24 is a comparison diagram of luminance distributions when fourth microstructures of the backlight module of FIG. 16 are averagely distributed on a bottom surface in different distribution densities.

FIG. 24 is a comparison diagram of luminance distributions when the fourth microstructures 180 of the backlight module 110E of FIG. 16 are averagely distributed on the bottom surface 140 in the different distribution densities of the fourth microstructures 180, where a solid line 24a, dot lines 24b, and dot lines 24c respectively represent the distances (unit, μm) of 300 μm, 90 μm, and 700 μm between the adjacent fourth microstructures 180. According to FIG. 24, it is known that the dot line 24b (corresponding to the distance of 90 μm between the adjacent fourth microstructures 180) has weaker light energy along a viewing angle of 90 degrees, i.e., when the distribution density of the fourth microstructures 180 is higher, the light energy is weaker. The solid line 24a (corresponding to the distance of 300 μm between the adjacent fourth microstructures 180) and the dot line 24c (corresponding to the distance of 700 μm between the adjacent fourth microstructures 180) have stronger light energy along the viewing angle of 90 degrees, i.e., when the distribution density of the fourth microstructures 180 is lower, the light energy is stronger. Therefore, in case that the fourth structures 180 are averagely distributed, when the distance between the adjacent fourth microstructures 180 ranges from 100 μm to 500 μm, the fourth microstructures 180 ensures the backlight module 110E to have a concentrate forward luminance distribution within a specific viewing angle range (for example, a viewing angle range between 70 degrees and 110 degrees), and concentrates most of the light beam to a specific viewing angle (for example, about 90 degrees), by which bright spot defects produced due to electrostatic adsorption is also avoided.

Figure 25:
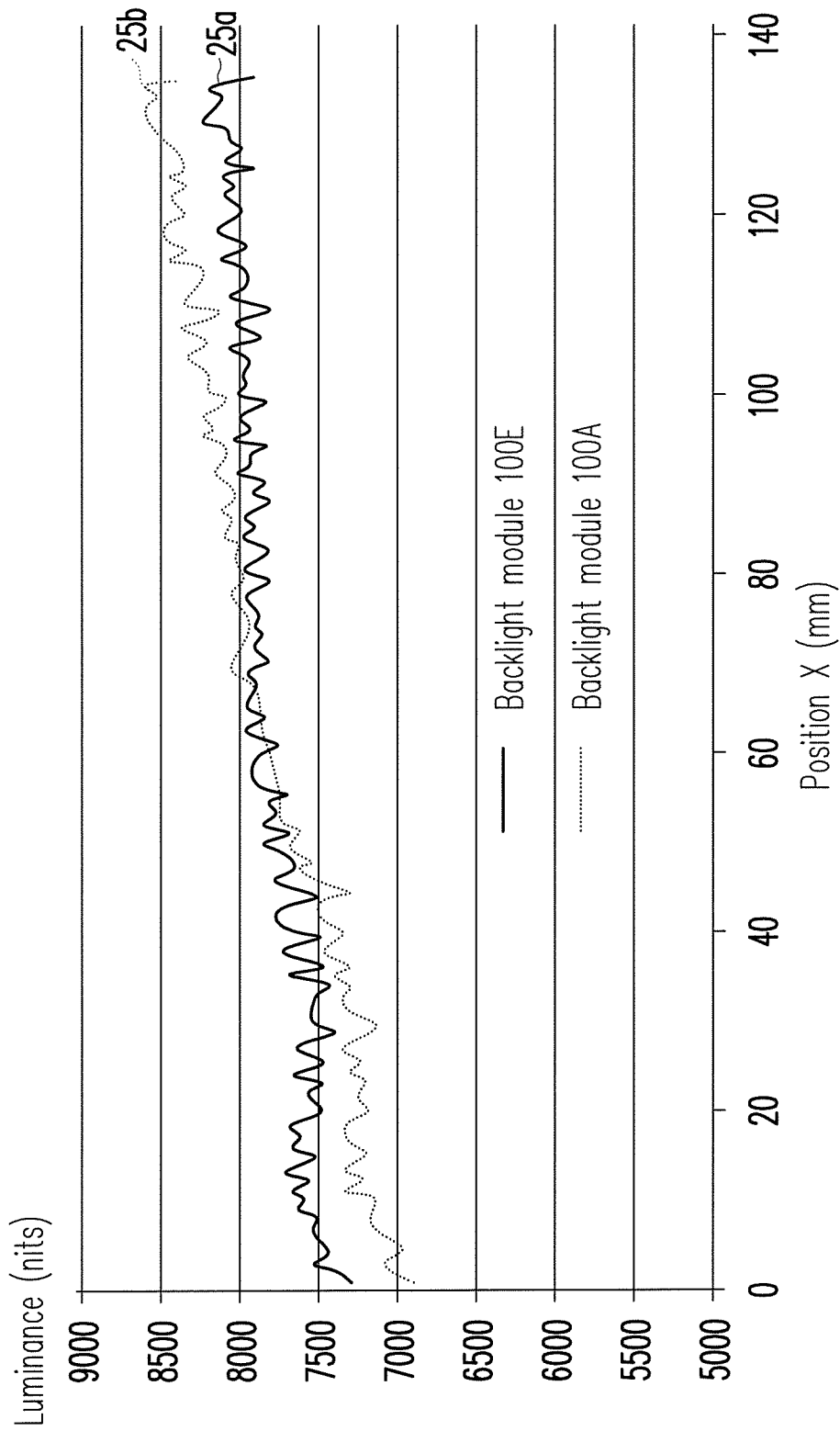
FIG. 25 is a comparison diagram of luminance distributions of the backlight module of FIG. 1A and the backlight module of FIG. 16 along an x-direction.

FIG. 25 is a comparison diagram of luminance distributions of the backlight module 100A of FIG. 1A and the backlight module 100E of FIG. 16 along the x-direction. Referring to FIG. 25, a solid line 25a represents a luminance distribution of the backlight module 100E of FIG. 16 (i.e. the LGP 110 is configured with the first microstructures 150 and the fourth microstructures 180) along the x-direction parallel to the light emitting surface 130 of the LGP 110, and a dot line 25b represents a luminance distribution of the backlight module 100A of FIG. 1A (i.e. the LGP 110 is configured with the first microstructures 150) along the x-direction parallel to the light emitting surface 130 of the LGP 110. According to FIG. 25, shown as the dot line 25b, in case that the LGP 110 is not configured with the fourth microstructures 180, the luminance distribution thereof has a lower luminance at a position where x is about 1 mm (a position close to the light incident surface 120), and has a higher luminance at a position where x is about 135 mm (a position away from the light incident surface 120). On the other hand, shown as the solid line 25a, in case that the LGP 110 is configured with the fourth microstructures 180, according to the luminance distribution thereof, the luminance at a position where x is about 1 mm is increased, and the luminance at a position where x is about 135 mm is decreased, i.e. when the LGP 110 is configured with the first microstructures 150 and the fourth microstructures 180, the luminance distribution thereof along the x-direction is even. Therefore, when the LGP 110 is configured with the fourth microstructures 180, besides that the bright spot defects produced due to electrostatic adsorption is avoided, the whole luminance distribution of the LGP 110 is also adjusted. In this way, the fourth microstructures 180 could be configured according to the luminance distribution of the backlight module, so as to provide a planar light source with higher uniformity and higher forward luminance.

Figure 26A:
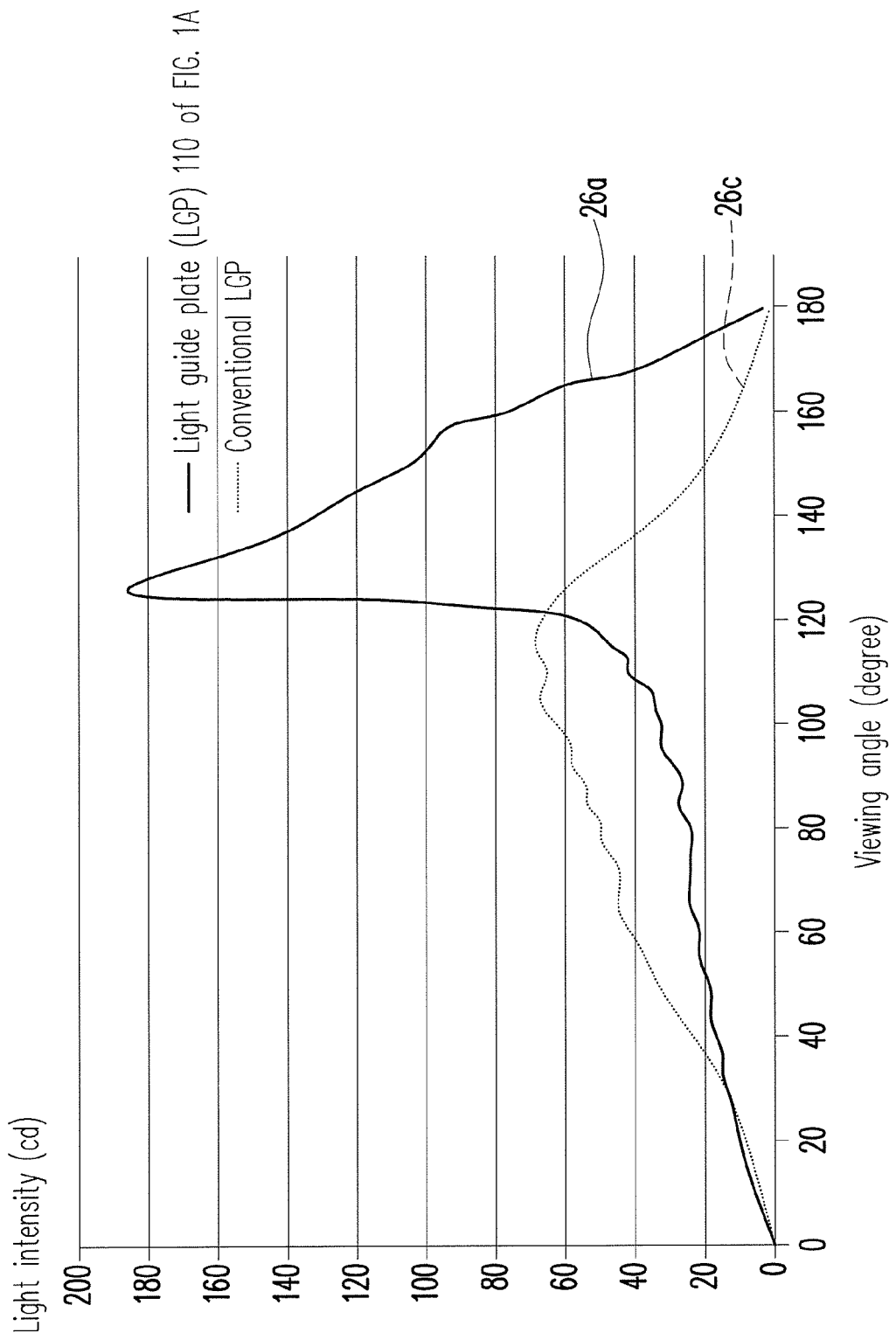
FIG. 26A is a comparison diagram of light intensity distributions on a light emitting surface of a LGP of FIG. 1A and a light emitting surface of a diffusion sheet of a conventional LGP configured with the diffusion sheet along an x-direction.
Figure 26B:
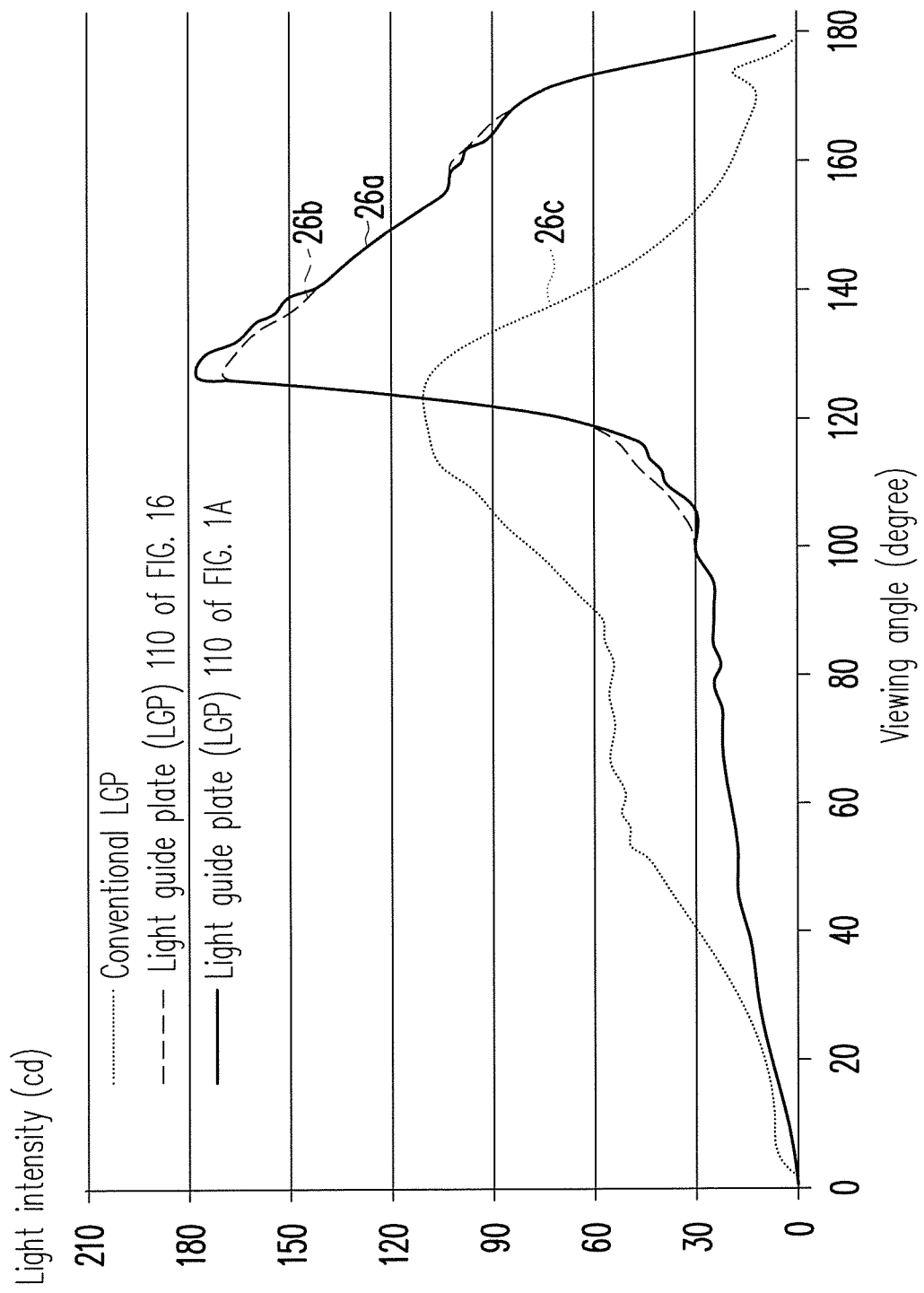
FIG. 26B is a comparison diagram of light intensity distributions on a light emitting surface of a LGP of FIG. 1A, a light emitting surface of a LGP of FIG. 16, and a light emitting surface of a diffusion sheet of a conventional LGP configured with the diffusion sheet along an x-direction after optimising simulation conditions.

FIG. 26A is a comparison diagram of light intensity distributions on the light emitting surface of the LGP 110 of FIG. 1A and a light emitting surface of a diffusion sheet of the conventional LGP configured with the diffusion sheet along the x-direction. FIG. 26B is a comparison diagram of light intensity distributions on the light emitting surface of the LGP 110 of FIG. 1A, the light emitting surface of the LGP 110 of FIG. 16, and a light emitting surface of a diffusion sheet of the conventional LGP configured with the diffusion sheet along the x-direction after optimising simulation conditions. The LGP 110 of FIG. 1A shown in FIG. 26B is the LGP 100 of FIG. 1A collocating with the extending manner of the first microstructures 150 of FIG. 9B. The LGP 110 of FIG. 16 shown in FIG. 26B is the LGP 110 of FIG. 16 collocating with the extending manner of the first microstructures 150 of FIG. 9B and collocating with the fourth microstructures 180 of FIG. 22B. The conventional LGP of FIG. 26B is a LGP including conventional micro lenses and configuring with a diffusion sheet. Referring to FIG. 26B, a solid line 26a represents a light intensity distribution on the light emitting surface 130 of the LGP 110 of FIG. 1A along the x-direction, a dot line 26b represents a light intensity distribution on the light emitting surface 130 of the LGP 110 of FIG. 16 along the x-direction, and a dot line 26c represents a light intensity distribution on the light emitting surface of the diffusion sheet of the conventional LGP configured with the diffusion sheet along the x-direction. According to FIG. 26B, it is known that the light intensity of the dot line 26c is relatively low, and a viewing angle range of light intensity full width at half maximum (FWHM) thereof ranges from 83 degrees to 143 degrees. The light intensity of the solid line 26a is relatively high, and a viewing angle range of light intensity FWHM thereof ranges from 122 degrees to 165 degrees. The light intensity of the dot line 26b is similar to that of the solid line 26a, and a viewing angle range of light intensity FWHM thereof ranges from 121 degrees to 168 degrees. Therefore, when the LGP 110 is configured with the fourth microstructure 180, the bright spot defects produced due to electrostatic adsorption is avoided, and meanwhile it is avoided to greatly influence the light intensity and viewing angle variation of the LGP 110. Therefore, in case that only the first microstructures 150 are used or the first microstructures 150 and the fourth microstructures 180 are used, the LGP 110 may have a concentrate x-direction luminance distribution within a specific viewing angle range (for example, a viewing angle range between 120 degrees and 170 degrees), and concentrate most of the light beam to a specific viewing angle (for example, about 130 degrees), where the light beam with the specific viewing angle is incident to the prism sheet 170 and guided by the prism sheet 170 to a direction parallel to the normal direction N of the light emitting surface 130, i.e. the specific viewing angle is a sum of 90 degrees and the included angle θ3 between the light emitting direction of the light beam 162 emitted from the light emitting surface 130 of the LGP 110 and the normal direction N of the light emitting surface 130.

Figure 27A:
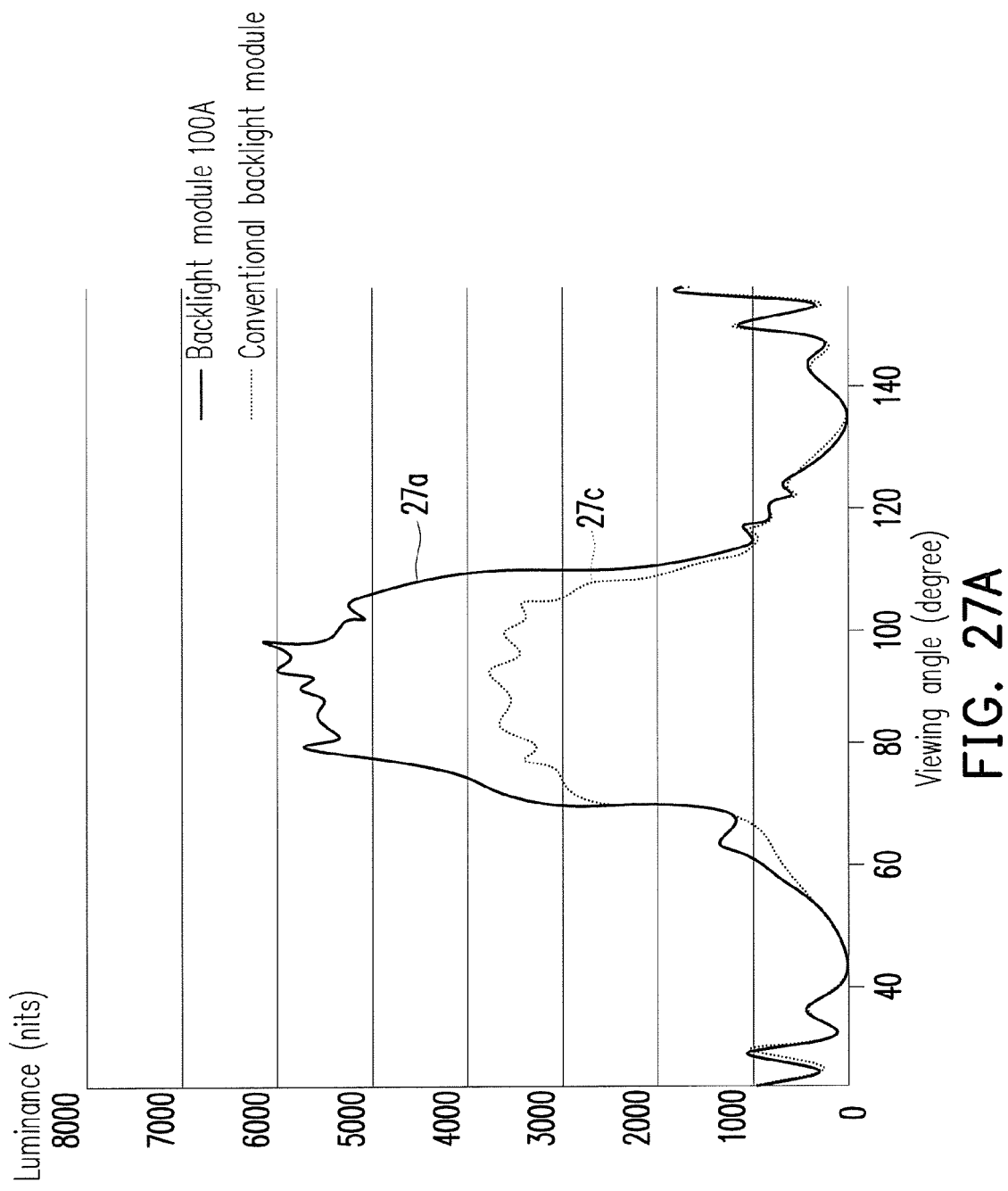
FIG. 27A is a comparison diagram of luminance distributions of the backlight module of FIG. 1A and a conventional backlight module.
Figure 27B:
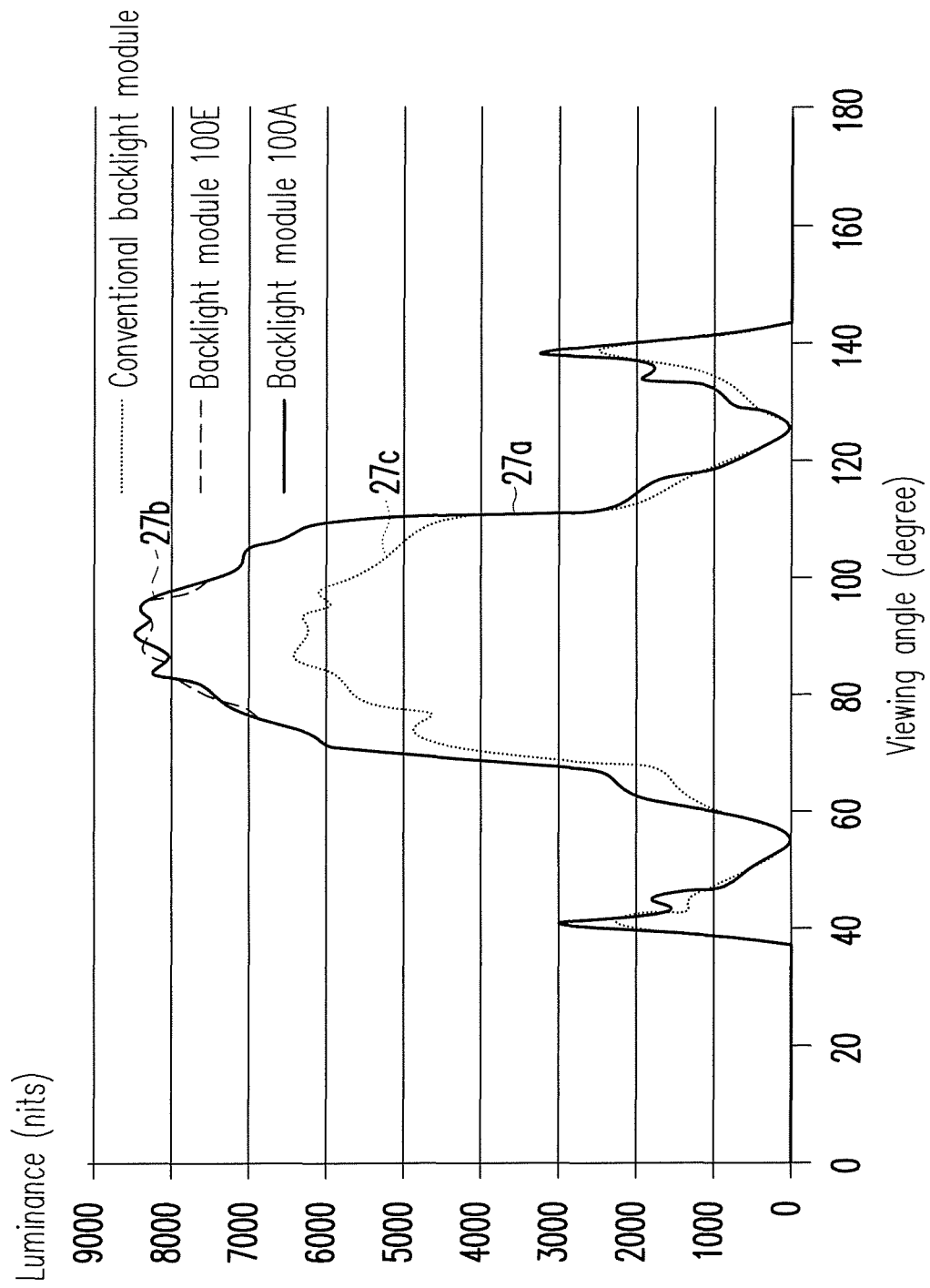
FIG. 27B is a comparison diagram of luminance distributions of the backlight module of FIG. 1A, the backlight module of FIG. 16, and a conventional backlight module after optimising simulation conditions.

FIG. 27A is a comparison diagram of luminance distributions of the backlight module 100A of FIG. 1A and the conventional backlight module. FIG. 27B is a comparison diagram of luminance distributions of the backlight module 100A of FIG. 1A, the backlight module 100E of FIG. 16, and the conventional backlight module after optimising simulation conditions. The backlight module 100A of FIG. 27B is the LGP 110 of FIG. 1A collocating with the extending manner of the first microstructures 150 of FIG. 9B. The backlight module 100E of FIG. 27B is the LGP 110 of FIG. 16 collocating with the extending manner of the first microstructures 150 of FIG. 9B and collocating with the fourth microstructures 180 of FIG. 22B. The conventional backlight module of FIG. 27B is a LGP including conventional micro lenses and configuring with a diffusion sheet and two prism sheets. Referring to FIG. 27B, a solid line 27a represents a luminance distribution of the backlight module 100A of FIG. 1A, a dot line 27b represents a luminance distribution of the backlight module 100E of FIG. 16, and a dot line 27c represents a luminance distribution of the conventional backlight module (configuring with the diffusion sheet and two prism sheets). According to FIG. 27B, by comparing light energy of the conventional backlight module, the backlight modules 100A and 100E, it is known that the light energy of the conventional backlight module along the viewing angle of 90 degrees is weaker than that of the backlight modules 100A and 100E, and the backlight modules 100A and 100E have a concentrate and higher light energy distribution along the viewing angle of 90 degrees. Therefore, the backlight modules 100A and 100E of the embodiment may achieve a good forward luminance without using a combination of the conventional micro lens and a diffusion sheet.

Figure 28:
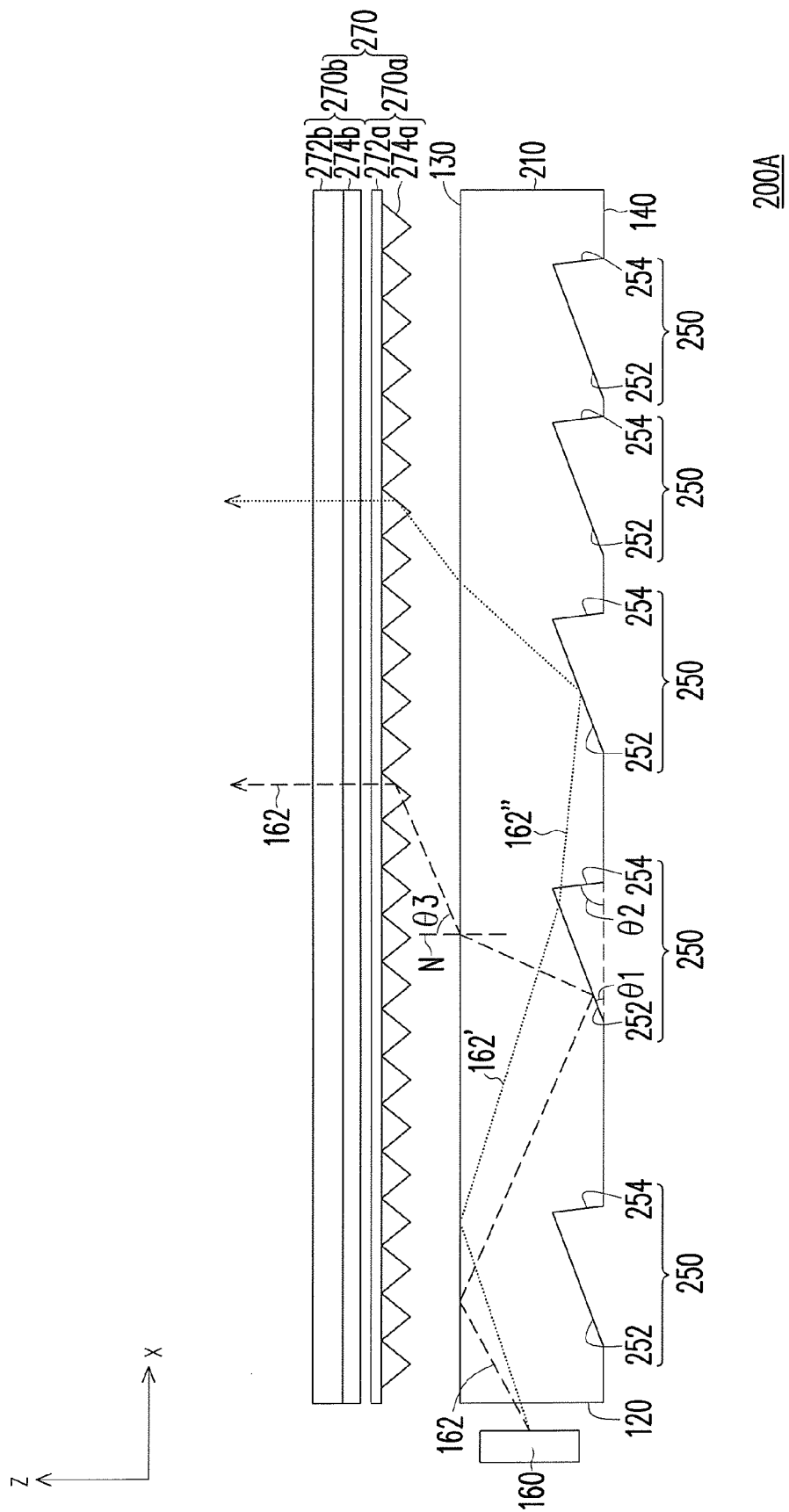
FIG. 28 is a schematic diagram of a backlight module according to another embodiment of the invention.

FIG. 28 is a schematic diagram of a backlight module according to another embodiment of the invention. Referring to FIG. 28, the backlight module 200A of the embodiment is similar to the backlight module 110A of FIG. 1A, and a difference there between is that an included angle θ1 between a first surface 252 and a bottom surface 140 of the first microstructures 250 of the LGP 210 of the backlight module 200A of the embodiment ranges from 1 degrees to 10 degrees (i.e. the included angle θ1 is greater than or equal to 1 degrees and smaller than or equal to 10 degrees), which is preferably 2 degrees. An included angle θ2 between the second surface 254 and the bottom surface 140 ranges from 0 degrees to 90 degrees (i.e. the included angle θ2 is greater than 0 degrees and smaller than or equal to 90 degrees). An included angle θ3 between a light emitting direction of a light beam 162 emitted from the light emitting surface 130 of the LGP 210 and a normal direction N of the light emitting surface 130 ranges from 79 degrees to 82 degrees. Furthermore, a length of the first microstructures 150 parallel to the x-axis ranges from 20 um to 150 um (not shown).

Moreover, the prism sheets 270 of the embodiment include a first prism sheet 270a and a second prism sheet 270b, the first prism sheet 270a and the second prism sheet 270b are both inverse prism sheets, and the first prism sheet 270a is disposed between the LGP 210 and the second prism sheet 270b. Furthermore, a plurality of first strip prism portions 274a are located between a transparent substrate 272a and the light emitting surface 130, a plurality of second strip prism portions 274b are located between the transparent substrate 272a and a transparent substrate 272b. However, in other embodiments could only use the first prism sheet 270a to achieve the same effect.

In detail, the prism sheets 270 are inverse prism sheets, the included angle θ1 between the first surface 252 and the bottom surface 140 of the first microstructures 250 of the LGP 210 from 1 degrees to 10 degrees is designed, result in the included angle θ3 between the light emitting direction of the light beam 162 emitted from the light emitting surface 130 of the LGP 210 and the normal direction N of the light emitting surface 130 from 79 degrees to 82 degrees, and the LGP 210 could effectively guide the light beam 162 to a direction capable of being fully used by the prism sheets 270. In this way, the light beam 162 that leaves the LGP 210 through the light emitting surface 130 is transmitted to the first prism sheet 270a, and the light beam 162 passing through the first prism sheet 270a is transmitted to the second prism sheet 270b, so that the light beam 162 is guided to a forward direction by the first strip prism portions 274a and the second strip prism portions 274b. Therefore, the backlight module 200A may have a better forward luminance (i.e. a luminance measured along the normal direction N of the light emitting surface 130). Furthermore, the second microstructures 125, 125', 125" disposed on the light incident surface 120, the third microstructures 135, 135', 135" disposed on the light emitting surface 130, and the fourth microstructures 180 disposed on the bottom surface 140 (not shown) could also be applied to this and other embodiments of the invention and achieve the same effect, though the invention is not limited thereto.

Figure 29A:
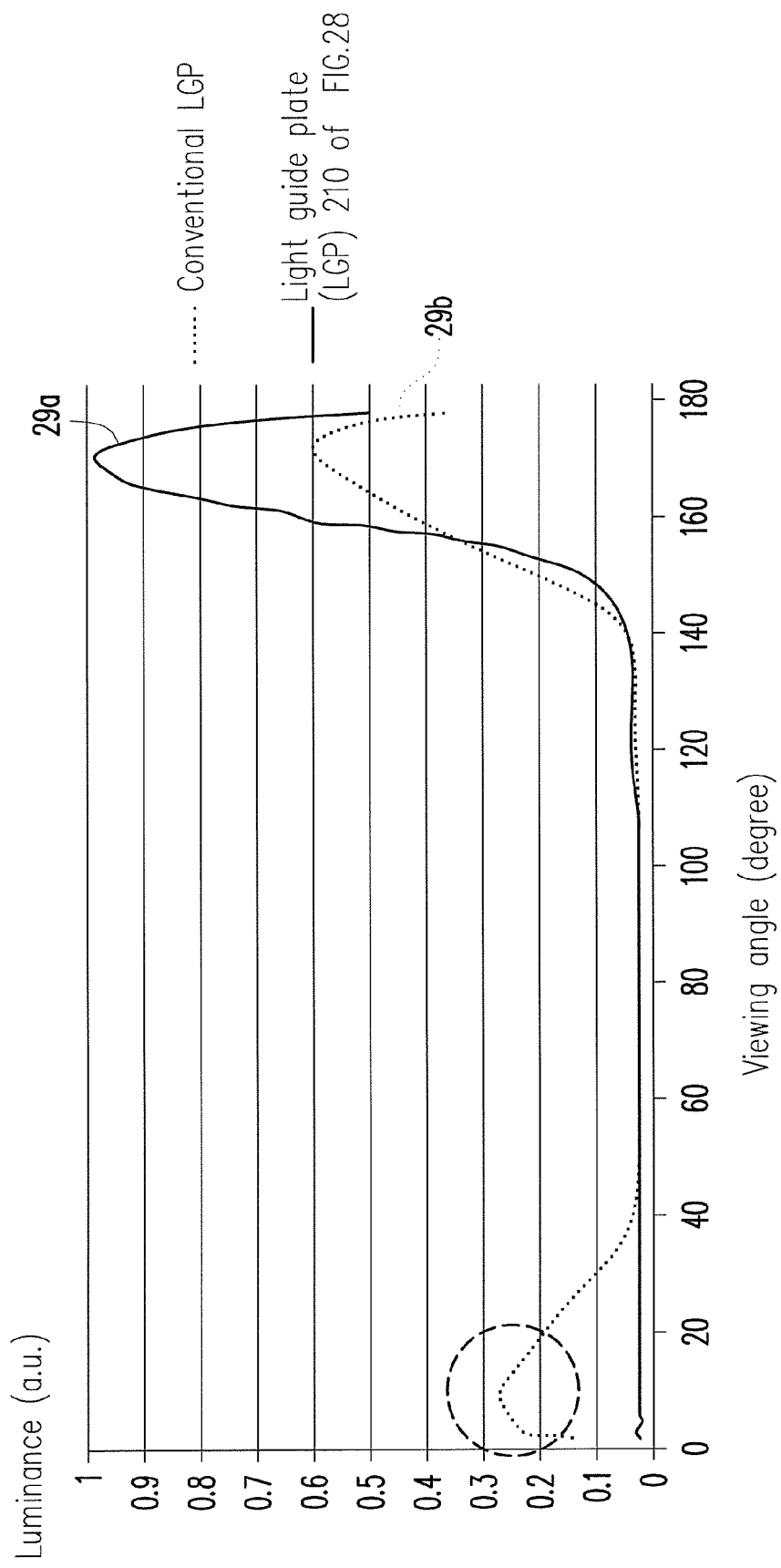
FIG. 29A is a comparison diagram of luminance distributions of the LGP of FIG. 28 and a conventional LGP.

FIG. 29A is a comparison diagram of luminance distributions of the LGP of FIG. 28 and a conventional LGP. The LGP 210 of FIG. 28 shown in FIG. 29A is the LGP 210 of FIG. 28 collocating with the extending manner of the first microstructures 150 of FIG. 9B. The conventional LGP shown in FIG. 29A is a LGP including conventional micro lenses. A solid line 29a represents a light intensity distribution on the light emitting surface 130 of the LGP 210 of FIG. 28 along the x-direction and a dot line 29b represents a light intensity distribution on the light emitting surface of the conventional along the x-direction. According to FIG. 29A, it is known that the peak value of the solid line 29a is 160 degrees and the peak value of the dot line 29b is 162 degrees, light utilization of the conventional LGP is insufficient, and a circle dot label at a left side of the dot line 29b produces a reflected light beam, result in luminance of the dot line 29b is decreased.

Figure 29B:
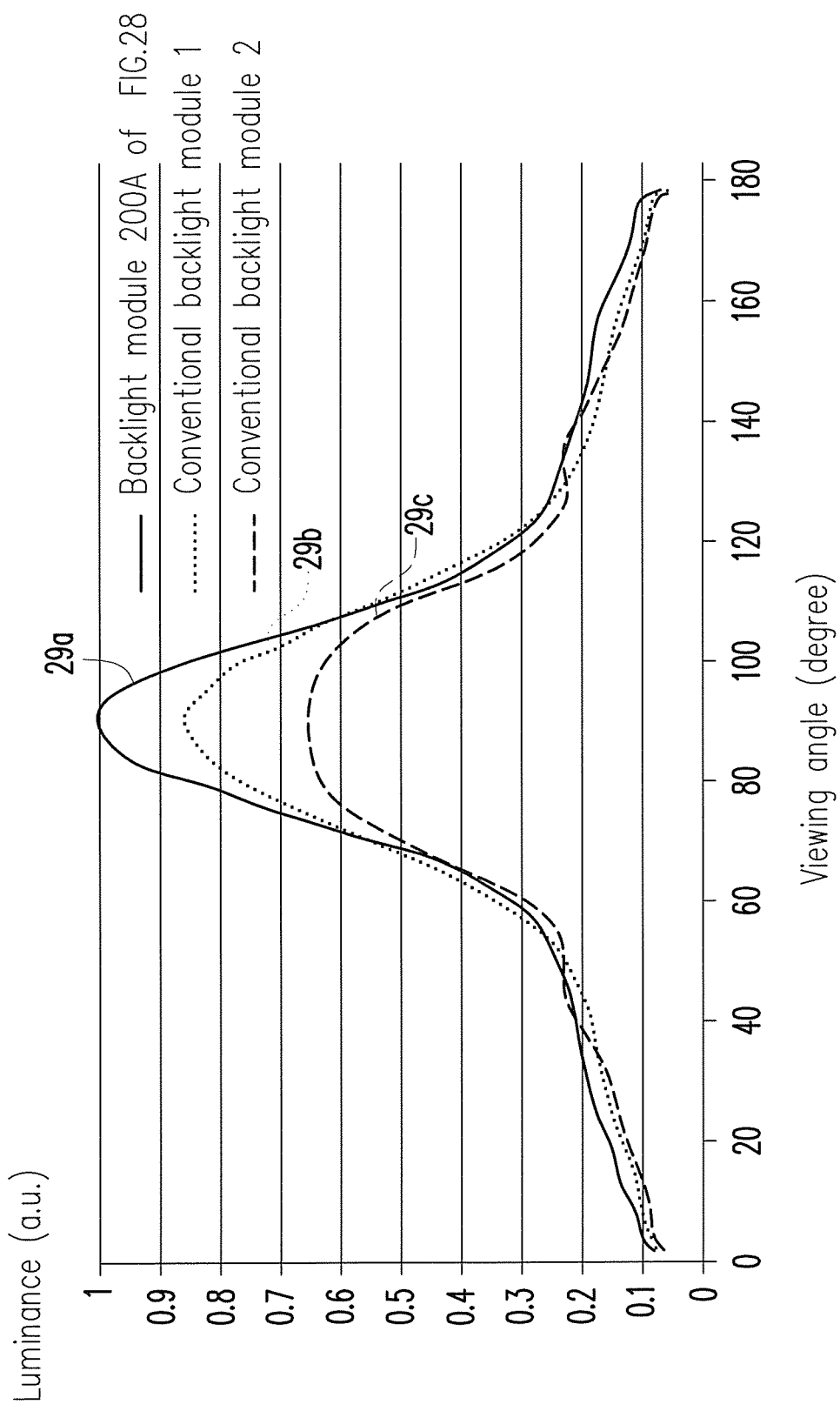
FIG. 29B is a comparison diagram of luminance distributions in horizontal viewing angle of the backlight module of FIG. 28, a conventional backlight module 1, and a conventional backlight module 2.
Figure 29C:
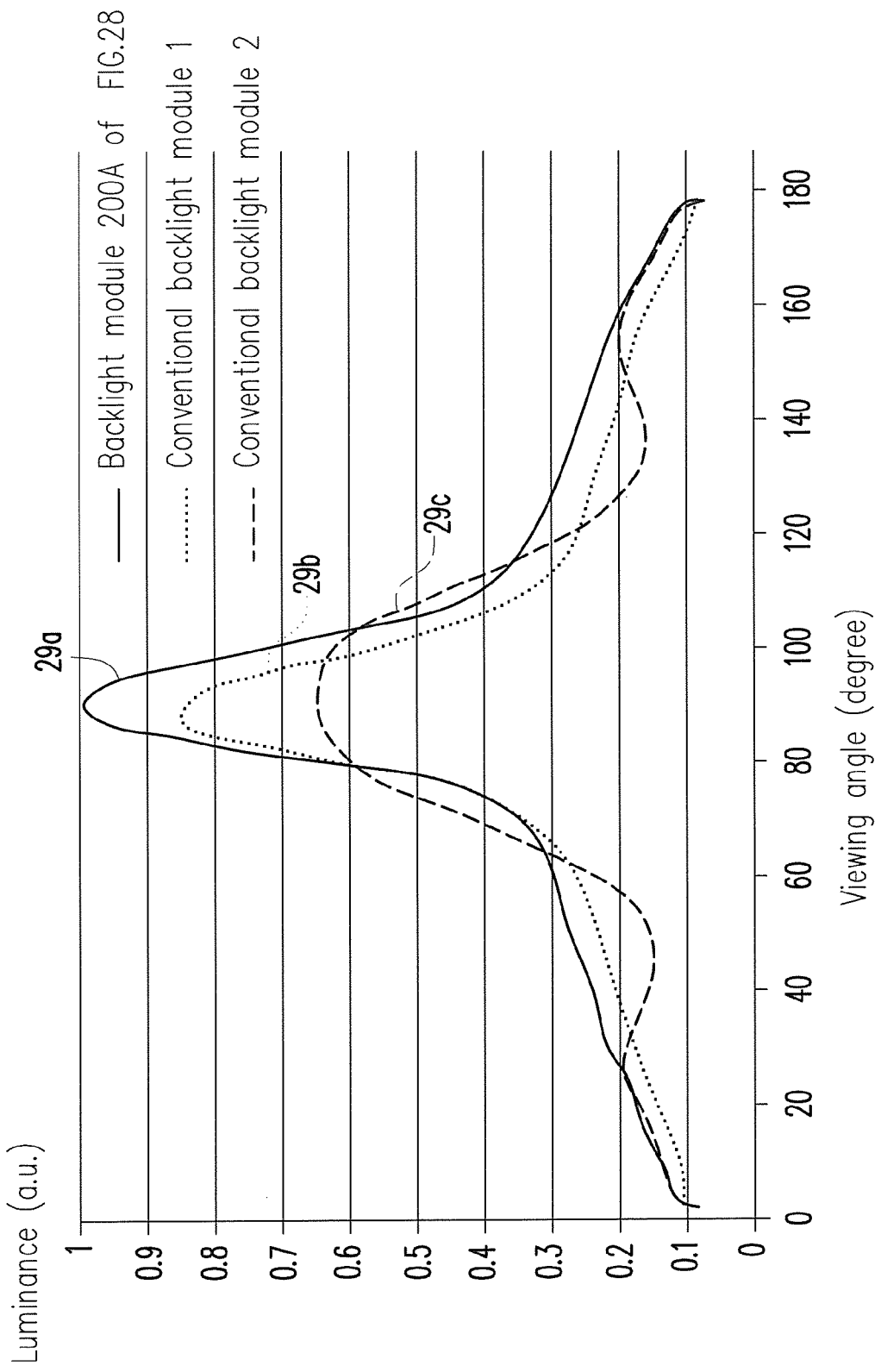
FIG. 29C is a comparison diagram of luminance distributions in vertical viewing angle of the backlight module of FIG. 28, a conventional backlight module 1, and a conventional backlight module 2.

FIG. 29B is a comparison diagram of luminance distributions in horizontal viewing angle of the backlight module of FIG. 28, a conventional backlight module 1, and a conventional backlight module 2. FIG. 29C is a comparison diagram of luminance distributions in vertical viewing angle of the backlight module of FIG. 28, a conventional backlight module 1, and a conventional backlight module 2. The backlight module 200A of FIG. 28 shown in FIGS. 29B and 29C is the LGP 210 of FIG. 28 collocating with the extending manner of the first microstructures 150 of FIG. 9B and configuring with the inverse prism sheet 270a and an optical film, wherein the optical film is, for example, a diffusion sheet or 3M's Dual Brightness Enhancement Film 4 (DBEF4). The conventional backlight module 1 shown in FIGS. 29B and 29C is the LGP including conventional micro lenses and configuring with the inverse prism sheet and the DBEF4. The conventional backlight module 2 shown in FIGS. 29B and 29C is the LGP including ink jet microstructures and configuring with a diffusion sheet, the two inverse prism sheets, and the DBEF4. A solid line 29a represents a luminance distribution of the backlight module 200A of FIG. 28, a dot line 29b represents a luminance distribution of the conventional backlight module 1, and a dot line 29c represents a luminance distribution of the conventional backlight module 2. According to FIGS. 29B and 29C, by comparing light energy of the backlight module 200A, the conventional backlight module 1, and the conventional backlight modules 2, it is known that the light energy of the conventional backlight module 1 and the conventional backlight module 2 along the viewing angle of 90 degrees is weaker than that of the backlight module 200a, and the backlight module 200A has a concentrate and higher light energy distribution along the viewing angle of 90 degrees. Therefore, the backlight modules 200A of the embodiment may achieve a good forward luminance in horizontal viewing angle and vertical viewing angle.

In summary, the embodiments of the invention have at least one of the following advantages or effects. In the backlight module of an embodiment of the invention, the LGP uses the first microstructures having the first surfaces and the second surfaces, where an included angle between the first surface and the bottom surface ranges from 15 degrees and 27 degrees, an included angle between the second surface and the bottom surface ranges from 50 degrees and 90 degrees, and an included angle between the light beam emitted from the light emitting surface of the LGP and the normal line of the light emitting surface is greater than 30 degrees. Therefore, in collaboration with the first surfaces and the second surfaces, the light could be effectively guided to a direction capable of being fully used by the prism sheet. In this way, the backlight module of the invention could provide a planar light source with higher uniformity and higher forward luminance. Moreover, when the LGP is configured with the fourth microstructures, it is avoided to produce bright spot defects due to electrostatic adsorption, and meanwhile a whole luminance distribution of the LGP could be adjusted. In the backlight module of another embodiment of the invention, the LGP uses the first microstructures having the first surfaces and the second surfaces, where an included angle between the first surface and the bottom surface ranges from 1 degrees and 10 degrees, an included angle between the second surface and the bottom surface ranges from 0 degrees and 90 degrees, and an included angle between the light beam emitted from the light emitting surface of the LGP and the normal line of the light emitting surface ranges from 79 degrees and 82 degrees. Therefore, in collaboration with the first surfaces and the second surfaces, the light could be effectively guided to a direction capable of being fully used by the inverse prism sheet. In this way, the backlight module of the invention could provide a planar light source with higher uniformity and higher forward luminance. Moreover, when the LGP is configured with the fourth microstructures, it is avoided to produce bright spot defects due to electrostatic adsorption, and meanwhile a whole luminance distribution of the LGP could be adjusted.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
    a light guide plate, having a light emitting surface, a bottom surface opposite to the light emitting surface, a light incident surface connecting with the light emitting surface and the bottom surface, a plurality of first microstructures on the bottom surface, and a plurality of fourth microstructures on the bottom surface, wherein each of the first microstructures is a recessed structure and comprises a first surface and a second surface, the first surface faces to the light incident surface, and an included angle between the first surface and the bottom surface ranges from 15 degrees to 27 degrees, the first surface of each of the first microstructures is located between the second surface and the light incident surface, and an included angle between the second surface and the bottom surface ranges from 50 degrees to 90 degrees, and wherein each of the fourth microstructures is a protruding structure attached to the bottom surface, a distribution density of the fourth microstructures away from the light incident surface is higher than a distribution density of the fourth microstructures close to the light incident surface, and a distance between the adjacent fourth microstructures ranges from 30 µm to 500 µm, wherein the fourth microstructures are disposed between adjacent first microstructures, and a gap is between each of the fourth microstructures and the first microstructures;
    a light source, providing a light beam, and the light beam entering the light guide plate via the light incident surface, wherein an included angle between a light emitting direction of the light beam emitted from the light emitting surface of the light guide plate and a normal direction of the light emitting surface is greater than 30 degrees; and
    at least one prism sheet, disposed above the light emitting surface.

2. The backlight module as claimed in claim 1, wherein the included angle between the light emitting direction of the light beam emitted from the light emitting surface of the light guide plate and the normal direction of the light emitting surface ranges from 30 degrees to 70 degrees.

3. The backlight module as claimed in claim 1, wherein each of the first microstructures extends along a path, and the path is composed of at least one straight line or at least one curve.

4. The backlight module as claimed in claim 1, wherein each of the first microstructures extends along a path, and the path is composed of at least one straight line and at least one curve.

5. The backlight module as claimed in claim 1, wherein viewing from the light emitting surface, a shape of each of the first microstructures is composed of at least one quadrilateral or at least one arc or at least one fan.

6. The backlight module as claimed in claim 1, wherein viewing from the light emitting surface, a shape of each of the first microstructures is composed of at least one quadrilateral and at least one arc.

7. The backlight module as claimed in claim 1, wherein the bottom surface is substantially perpendicular to the light incident surface.

8. The backlight module as claimed in claim 1, further comprising a plurality of second microstructures on the light incident surface.

9. The backlight module as claimed in claim 1, further comprising a plurality of third microstructures on the light emitting surface.

10. The backlight module as claimed in claim 1, wherein the at least one prism sheet comprises:
a first prism sheet, comprising a plurality of first strip prism portions parallel to each other; and
a second prism sheet, comprising a plurality of second strip prism portions parallel to each other, wherein the first prism sheet is disposed between the light guide plate and the second prism sheet, and an extending direction of the first strip prism portions is substantially perpendicular to an extending direction of the second strip prism portions.

11. The backlight module as claimed in claim 1, further comprising a diffusion sheet, wherein the diffusion sheet is disposed between the light guide plate and the at least one prism sheet.

12. The backlight module as claimed in claim 1, wherein the first microstructures are disposed on the bottom surface in dispersion, and a distribution density of the first microstructures away from the light incident surface is higher than a distribution density of the first microstructures close to the light incident surface, or the first microstructures are averagely disposed on the bottom surface.

13. The backlight module as claimed in claim 1, wherein each of the fourth microstructures has a third surface, and the third surface protrudes out from the bottom surface.

14. The backlight module as claimed in claim 13, wherein viewing from the light emitting surface, a shape of an orthographic projection of each of the fourth microstructures on the bottom surface is a round, an ellipse or a polygon.

15. The backlight module as claimed in claim 13, wherein the third surface is a circular arc surface.

16. The backlight module as claimed in claim 15, wherein a tangent plane of the circular arc surface is parallel to the bottom surface, and a vertical distance between the tangent plane and the bottom surface ranges from 3 μm to 10 μm.

17. The backlight module as claimed in claim 13, wherein the third surface has at least one side surface and a supporting bottom surface, and the supporting bottom surface is a curved surface or a plane.

18. The backlight module as claimed in claim 17, wherein a vertical distance between the supporting bottom surface and the bottom surface ranges from 3 μm to 10 μm.

19. The backlight module as claimed in claim 13, wherein a width of the orthographic projection of the third surface on the bottom surface ranges from 10 μm to 60 μm.

20. The backlight module as claimed in claim 1, wherein the distribution density of the fourth microstructures is lower than a distribution density of the first microstructures.

21. The backlight module as claimed in claim 1, wherein the distance between the adjacent fourth microstructures ranges from 100 μm to 500 μm.

22. The backlight module as claimed in claim 1, wherein a viewing angle range of light intensity full width at half maximum (FWHM) of the light beam emitted from the light emitting surface of the light guide plate ranges from 120 degrees to 170 degrees.

23. The backlight module as claimed in claim 2, wherein the included angle between the light emitting direction of the light beam emitted from the light emitting surface of the light guide plate and the normal direction of the light emitting surface ranges from 40 degrees to 60 degrees.

24. The backlight module as claimed in claim 1, wherein the included angle between the light emitting direction of the light beam emitted from the light emitting surface of the light guide plate and the normal direction of the light emitting surface is greater than 40 degrees.

25. A light guide plate, comprising:
a light emitting surface;
a bottom surface opposite to the light emitting surface;
a light incident surface connecting with the light emitting surface and the bottom surface;
a plurality of first microstructures on the bottom surface, wherein each of the first microstructures is a recessed structure and comprises a first surface and a second surface, the first surface faces to the light incident surface, and an included angle between the first surface and the bottom surface ranges from 15 degrees to 27 degrees, the first surface of each of the first microstructures is located between the second surface and the light incident surface, and an included angle between the second surface and the bottom surface ranges from 50 degrees to 90 degrees; and
a plurality of fourth microstructures on the bottom surface, wherein each of the fourth microstructures is a protruding structure attached to the bottom surface, a distribution density of the fourth microstructures away from the light incident surface is higher than a distribution density of the fourth microstructures close to the light incident surface, and a distance between the adjacent fourth microstructures ranges from 30 μm to 500 μm, wherein the fourth microstructures are disposed between adjacent first microstructures, and a gap is between each of the fourth microstructures and the first microstructures.

26. The light guide plate as claimed in claim 25, wherein each of the first microstructures extends along a path, and the path is composed of at least one straight line or at least one curve.

27. The light guide plate as claimed in claim 25, wherein each of the first microstructures extends along a path, and the path is composed of at least one straight line and at least one curve.

28. The light guide plate as claimed in claim 25, wherein viewing from the light emitting surface, a shape of each of the first microstructures is composed of at least one quadrilateral or at least one arc or at least one fan.

29. The light guide plate as claimed in claim 25, wherein viewing from the light emitting surface, a shape of each of the first microstructures is composed of at least one quadrilateral and at least one arc.

30. The light guide plate as claimed in claim 25, further comprising a plurality of second microstructures on the light incident surface.

31. The light guide plate as claimed in claim 25, further comprising a plurality of third microstructures on the light emitting surface.

32. The light guide plate as claimed in claim 25, wherein the first microstructures are disposed on the bottom surface in dispersion, and a distribution density of the first microstructures away from the light incident surface is higher than a distribution density of the first microstructures close to the light incident surface, or the first microstructures are averagely disposed on the bottom surface.

33. The light guide plate as claimed in claim 25, wherein each of the fourth microstructures has a third surface, and the third surface protrudes out from the bottom surface.

34. The light guide plate as claimed in claim 33, wherein viewing from the light emitting surface, a shape of an orthographic projection of each of the fourth microstructures on the bottom surface is a round, an ellipse or a polygon.

35. The light guide plate as claimed in claim 33, wherein the third surface is a circular arc surface.

36. The light guide plate as claimed in claim 35, wherein a tangent plane of the circular arc surface is parallel to the bottom surface, and a vertical distance between the tangent plane and the bottom surface ranges from 3 μm to 10 μm.

37. The light guide plate as claimed in claim 33, wherein the third surface has at least one side surface and a supporting bottom surface, and the supporting bottom surface is a curved surface or a plane.

38. The light guide plate as claimed in claim 37, wherein a vertical distance between the supporting bottom surface and the bottom surface ranges from 3 μm to 10 μm.

39. The light guide plate as claimed in claim 33, wherein a width of the orthographic projection of the third surface on the bottom surface ranges from 10 μm to 60 μm.

40. The light guide plate as claimed in claim 25, wherein the distribution density of the fourth microstructures is lower than a distribution density of the first microstructures.

41. The light guide plate as claimed in claim 25, wherein the distance between the adjacent fourth microstructures ranges from 100 μm to 500 μm.

42. A backlight module, comprising:
a light guide plate, having a light emitting surface, a bottom surface opposite to the light emitting surface, a light incident surface connecting with the light emitting surface and the bottom surface, a plurality of first microstructures on the bottom surface, and a plurality of fourth microstructures on the bottom surface, wherein each of the first microstructures is a recessed structure and comprises a first surface and a second surface, the first surface faces to the light incident surface, and an included angle between the first surface and the bottom surface ranges from 1 degrees to 10 degrees, the first surface of each of the first microstructures is located between the second surface and the light incident surface, and an included angle between the second surface and the bottom surface ranges from 0 degrees to 90 degrees, and wherein each of the fourth microstructures is a protruding structure attached to the bottom surface, a distribution density of the fourth microstructures away from the light incident surface is higher than a distribution density of the fourth microstructures close to the light incident surface, and a distance between the adjacent fourth microstructures ranges from 30 μm to 500 μm, wherein the fourth microstructures are disposed between adjacent first microstructures, and a gap is between each of the fourth microstructures and the first micro structures;
a light source, providing a light beam, and the light beam entering the light guide plate via the light incident surface, wherein an included angle between a light emitting direction of the light beam emitted from the light emitting surface of the light guide plate and a normal direction of the light emitting surface is from 79 degrees to 82 degrees; and
at least one prism sheet, disposed above the light emitting surface.

43. The backlight module as claimed in claim 42, wherein the prism sheet is an inverse prism sheet and comprises a transparent substrate and a plurality of strip prism portions parallel to each other formed on the transparent substrate, and the strip prism portions are located between the transparent substrate and the light guide plate.

44. A light guide plate, comprising:
a light emitting surface;
a bottom surface opposite to the light emitting surface;
a light incident surface connecting with the light emitting surface and the bottom surface;
a plurality of first microstructures on the bottom surface, wherein each of the first microstructures is a recessed structure and comprises a first surface and a second surface, the first surface faces to the light incident surface, and an included angle between the first surface and the bottom surface ranges from 1 degrees to 10 degrees, the first surface of each of the first microstructures is located between the second surface and the light incident surface, and an included angle between the second surface and the bottom surface ranges from 0 degrees to 90 degrees; and
a plurality of fourth microstructures on the bottom surface, wherein each of the fourth microstructures is a protruding structure attached to the bottom surface, a distribution density of the fourth microstructures away from the light incident surface is higher than a distribution density of the fourth microstructures close to the light incident surface, and a distance between the adjacent fourth microstructures ranges from 30 μm to 500 μm, wherein the fourth microstructures are disposed between adjacent first microstructures, and a gap is between each of the fourth microstructures and the first microstructures.

* * * * *